US012696838B2

(12) United States Patent
Lai et al.

(10) Patent No.: US 12,696,838 B2
(45) Date of Patent: Aug. 4, 2026

(54) GARDEN TOOL POWER SOURCE COMPARTMENT HAVING DRAINAGE

(71) Applicant: TECHTRONIC CORDLESS GP, Anderson, SC (US)

(72) Inventors: Hok Sum Sam Lai, Hong Kong (CN); Ho Lam Ng, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 393 days.

(21) Appl. No.: 18/303,388

(22) Filed: Apr. 19, 2023

(65) Prior Publication Data

US 2023/0337584 A1     Oct. 26, 2023

Related U.S. Application Data

(60) Provisional application No. 63/374,178, filed on Aug. 31, 2022, provisional application No. 63/332,863, filed on Apr. 20, 2022.

(51) Int. Cl.
| | |
|---|---|
| *A01D 34/81* | (2006.01) |
| *A01D 34/00* | (2006.01) |
| *A01D 101/00* | (2006.01) |

(52) U.S. Cl.
CPC ............ *A01D 34/81* (2013.01); *A01D 34/008* (2013.01); *A01D 2101/00* (2013.01)

(58) Field of Classification Search
CPC ...... A01D 34/001; A01D 34/78; A01D 34/81; A01D 69/02; B60L 50/64; H01M 50/249
USPC ...................................... 296/187.01
See application file for complete search history.

(56) References Cited

U.S. PATENT DOCUMENTS

| | | | |
|---|---|---|---|
| 923,312 | A | 6/1909 | Alexanderson |
| 2,511,124 | A | 6/1950 | Phelps |
| 2,539,779 | A | 1/1951 | Grosso |
| 2,701,942 | A | 2/1955 | Caldwell, Jr. et al. |
| 2,751,030 | A | 6/1956 | Null |

(Continued)

FOREIGN PATENT DOCUMENTS

| | | |
|---|---|---|
| AU | 2006100911 A4 | 11/2006 |
| AU | 2011239326 A1 | 11/2011 |

(Continued)

OTHER PUBLICATIONS

US 8,272,092 B2, 09/2012, Schnittman et al. (withdrawn)

(Continued)

*Primary Examiner* — Robert E Fuller
(74) *Attorney, Agent, or Firm* — Michael Best & Friedrich LLP

(57) ABSTRACT

A garden tool includes a prime mover, a housing, a power source, and a door. The housing defines a power source compartment. The housing also defines a first aperture and a second aperture each in communication with the power source compartment. The power source is configured to provide power to the prime mover. The power source is removably receivable in the power source compartment. The door is configured to move between a closed position in which the first aperture is closed and an open position in which the first aperture is open. The second aperture is configured to provide fluid communication between the power source compartment and an external environment for draining fluid from the power source compartment.

12 Claims, 11 Drawing Sheets

(56)                  References Cited

U.S. PATENT DOCUMENTS

| | | | |
|---|---|---|---|
| 2,914,902 A | 12/1959 | Beymer |
| 3,057,140 A | 10/1962 | Amos et al. |
| 3,147,662 A | 9/1964 | Snook |
| 3,311,738 A | 3/1967 | Makow |
| 3,393,598 A | 7/1968 | Bettinger |
| 3,500,622 A | 3/1970 | Bowen |
| 3,570,227 A | 3/1971 | Bellinger |
| 3,612,574 A | 10/1971 | Klopfer et al. |
| 3,680,295 A | 8/1972 | Rutherford |
| 3,776,327 A | 12/1973 | Klopfer et al. |
| 4,065,913 A | 1/1978 | Fisher et al. |
| 4,126,990 A | 11/1978 | Fisher et al. |
| 4,126,991 A | 11/1978 | Gobin et al. |
| 4,165,597 A | 8/1979 | Scanland et al. |
| 4,205,510 A | 6/1980 | Raniero |
| 4,268,964 A | 5/1981 | Moore |
| 4,306,375 A | 12/1981 | Goldfarb et al. |
| 4,333,202 A | 6/1982 | Block |
| 4,351,132 A | 9/1982 | Molin |
| 4,468,884 A | 9/1984 | Goldfarb et al. |
| 4,492,058 A | 1/1985 | Goldfarb et al. |
| 4,511,343 A | 4/1985 | Goldfarb et al. |
| 4,522,606 A | 6/1985 | Goldfarb et al. |
| 4,547,166 A | 10/1985 | Goldfarb et al. |
| 4,591,347 A | 5/1986 | Goldfarb et al. |
| 4,596,412 A | 6/1986 | Everett et al. |
| 4,627,563 A | 12/1986 | Meyer |
| 4,652,247 A | 3/1987 | Goldfarb et al. |
| 4,673,370 A | 6/1987 | Goldfarb et al. |
| 4,693,656 A | 9/1987 | Guthrie |
| 4,787,794 A | 11/1988 | Guthrie |
| 4,826,066 A | 5/1989 | Koester et al. |
| 4,902,260 A | 2/1990 | Im |
| 4,916,813 A | 4/1990 | Elia |
| 4,951,985 A | 8/1990 | Pong et al. |
| 4,958,068 A | 9/1990 | Pong et al. |
| 4,962,453 A | 10/1990 | Pong, Jr. et al. |
| 4,964,265 A | 10/1990 | Young |
| 4,968,878 A | 11/1990 | Pong et al. |
| 5,024,728 A | 6/1991 | Morita et al. |
| 5,025,969 A | 6/1991 | Koester et al. |
| 5,323,593 A | 6/1994 | Cline et al. |
| 5,363,633 A | 11/1994 | Masaru |
| 5,402,110 A | 3/1995 | Oliver et al. |
| 5,406,778 A | 4/1995 | Lamb et al. |
| 5,507,137 A | 4/1996 | Norris |
| 5,540,037 A | 7/1996 | Lamb et al. |
| 5,548,278 A | 8/1996 | Oliver et al. |
| 5,553,445 A | 9/1996 | Lamb et al. |
| 5,561,972 A | 10/1996 | Rolfe |
| 5,572,856 A | 11/1996 | Ku |
| 5,577,868 A | 11/1996 | Chen |
| 5,703,569 A | 12/1997 | Oliver et al. |
| 5,785,480 A | 7/1998 | Difeo |
| 5,821,731 A | 10/1998 | Kuki et al. |
| 5,850,135 A | 12/1998 | Kuki et al. |
| 5,916,111 A | 6/1999 | Colens |
| 5,942,869 A | 8/1999 | Katou et al. |
| 6,076,025 A | 6/2000 | Ueno et al. |
| 6,101,795 A | 8/2000 | Diekhans |
| 6,212,917 B1 | 4/2001 | Rathbun |
| 6,255,793 B1 | 7/2001 | Peless et al. |
| 6,300,737 B1 | 10/2001 | Bergvall et al. |
| 6,321,515 B1 | 11/2001 | Colens |
| D451,931 S | 12/2001 | Abramson et al. |
| 6,338,013 B1 | 1/2002 | Ruffner |
| 6,339,735 B1 | 1/2002 | Peless et al. |
| 6,417,641 B2 | 7/2002 | Peless et al. |
| 6,442,845 B2 | 9/2002 | Wheeler et al. |
| 6,443,509 B1 | 9/2002 | Levin et al. |
| 6,460,253 B1 | 10/2002 | Wheeler et al. |
| 6,465,982 B1 | 10/2002 | Bergvall et al. |
| 6,481,515 B1 | 11/2002 | Kirkpatrick et al. |
| 6,493,613 B2 | 12/2002 | Peless et al. |
| 6,502,017 B2 | 12/2002 | Ruffner |
| 6,525,509 B1 | 2/2003 | Petersson et al. |
| 6,586,908 B2 | 7/2003 | Petersson et al. |
| 6,594,844 B2 | 7/2003 | Jones |
| 6,600,981 B2 | 7/2003 | Ruffner |
| 6,604,348 B2 | 8/2003 | Hunt |
| 6,611,738 B2 | 8/2003 | Ruffner |
| 6,615,108 B1 | 9/2003 | Peless et al. |
| 6,636,847 B1 | 10/2003 | Spires |
| 6,650,975 B2 | 11/2003 | Ruffner |
| 6,662,889 B2 | 12/2003 | De Fazio et al. |
| 6,728,607 B1 | 4/2004 | Anderson |
| 6,763,282 B2 | 7/2004 | Glenn et al. |
| 6,779,217 B2 | 8/2004 | Fisher |
| 6,809,490 B2 | 10/2004 | Jones et al. |
| 6,813,557 B2 | 11/2004 | Schmidt et al. |
| 6,850,024 B2 | 2/2005 | Peless et al. |
| 6,870,792 B2 | 3/2005 | Chiappetta |
| 6,879,878 B2 | 4/2005 | Glenn et al. |
| 6,885,912 B2 | 4/2005 | Peless et al. |
| 6,907,336 B2 | 6/2005 | Gray et al. |
| 6,934,615 B2 | 8/2005 | Flann et al. |
| 6,984,952 B2 | 1/2006 | Peless et al. |
| 7,010,425 B2 | 3/2006 | Gray et al. |
| 7,024,842 B2 | 4/2006 | Hunt et al. |
| 7,024,843 B2 | 4/2006 | Hunt et al. |
| 7,047,712 B1 | 5/2006 | Hunt et al. |
| 7,053,580 B2 | 5/2006 | Aldred |
| 7,069,111 B2 | 6/2006 | Glenn et al. |
| 7,076,348 B2 | 7/2006 | Bucher et al. |
| 7,079,923 B2 | 7/2006 | Abramson et al. |
| 7,079,943 B2 | 7/2006 | Flann et al. |
| 7,085,624 B2 | 8/2006 | Aldred et al. |
| 7,103,457 B2 | 9/2006 | Dean |
| 7,110,881 B2 | 9/2006 | Gray et al. |
| 7,114,318 B2 | 10/2006 | Poulson et al. |
| 7,117,660 B1 | 10/2006 | Colens |
| 7,133,746 B2 | 11/2006 | Abramson et al. |
| 7,146,786 B2 | 12/2006 | Brandon |
| 7,155,308 B2 | 12/2006 | Jones |
| 7,155,309 B2 | 12/2006 | Peless et al. |
| 7,166,983 B2 | 1/2007 | Jung |
| 7,167,775 B2 | 1/2007 | Abramson et al. |
| 7,173,391 B2 | 2/2007 | Jones et al. |
| 7,174,157 B2 | 2/2007 | Gassho et al. |
| 7,211,980 B1 | 5/2007 | Bruemmer et al. |
| 7,216,033 B2 | 5/2007 | Flann et al. |
| 7,227,334 B2 | 6/2007 | Yang et al. |
| 7,228,214 B2 | 6/2007 | Flann et al. |
| 7,233,683 B2 | 6/2007 | Han et al. |
| 7,242,791 B2 | 7/2007 | Han et al. |
| 7,286,902 B2 | 10/2007 | Kim et al. |
| D559,867 S | 1/2008 | Abramson |
| 7,332,890 B2 | 2/2008 | Cohen et al. |
| 7,349,759 B2 | 3/2008 | Peless et al. |
| 7,363,994 B1 | 4/2008 | Defazio et al. |
| 7,369,460 B2 | 5/2008 | Chiappetta et al. |
| 7,369,924 B2 | 5/2008 | Han et al. |
| 7,388,343 B2 | 6/2008 | Jones et al. |
| D573,610 S | 7/2008 | Abramson |
| 7,395,648 B1 | 7/2008 | Silbernagel et al. |
| 7,418,328 B2 | 8/2008 | Romig |
| 7,429,843 B2 | 9/2008 | Jones et al. |
| 7,430,455 B2 | 9/2008 | Casey et al. |
| 7,444,214 B2 | 10/2008 | Cho et al. |
| 7,469,525 B2 | 12/2008 | Zeigler et al. |
| 7,474,941 B2 | 1/2009 | Kim et al. |
| 7,480,958 B2 | 1/2009 | Song et al. |
| 7,480,960 B2 | 1/2009 | Kim |
| 7,497,053 B2 | 3/2009 | Nicolet |
| 7,499,774 B2 | 3/2009 | Barrett et al. |
| 7,499,775 B2 | 3/2009 | Filippov et al. |
| 7,499,776 B2 | 3/2009 | Allard et al. |
| 7,499,804 B2 | 3/2009 | Svendsen et al. |
| 7,505,848 B2 | 3/2009 | Flann et al. |
| 7,539,557 B2 | 5/2009 | Yamauchi |
| 7,568,873 B1 | 8/2009 | Rambo |
| 7,574,282 B2 | 8/2009 | Petersson et al. |
| 7,577,499 B2 | 8/2009 | Sun et al. |
| 7,587,260 B2 | 9/2009 | Bruemmer et al. |

(56) References Cited

U.S. PATENT DOCUMENTS

| | | | |
|---|---|---|---|
| 7,590,413 | B2 | 9/2009 | May |
| 7,596,934 | B2 | 10/2009 | Waesche et al. |
| 7,610,122 | B2 | 10/2009 | Anderson |
| 7,610,123 | B2 | 10/2009 | Han et al. |
| 7,613,543 | B2 | 11/2009 | Petersson et al. |
| 7,614,835 | B2 | 11/2009 | Kitamura |
| 7,617,890 | B2 | 11/2009 | Romig |
| 7,647,144 | B2 | 1/2010 | Haegermarck |
| D610,072 | S | 2/2010 | Wallet et al. |
| 7,663,333 | B2 | 2/2010 | Jones et al. |
| 7,688,676 | B2 | 3/2010 | Chiappetta et al. |
| 7,690,066 | B2 | 4/2010 | Stoltz et al. |
| D615,920 | S | 5/2010 | Kline et al. |
| 7,707,812 | B2 | 5/2010 | Cheung |
| 7,720,572 | B2 | 5/2010 | Ziegler et al. |
| 7,729,801 | B2 | 6/2010 | Abramson |
| 7,730,705 | B2 | 6/2010 | Kubinski |
| 7,769,490 | B2 | 8/2010 | Abramson et al. |
| 7,787,989 | B2 | 8/2010 | Colens |
| 7,792,607 | B2 | 9/2010 | Han et al. |
| 7,801,645 | B2 | 9/2010 | Taylor et al. |
| 7,805,220 | B2 | 9/2010 | Taylor et al. |
| 7,805,676 | B2 | 9/2010 | Schemers et al. |
| 7,805,918 | B2 | 10/2010 | Silbernagel et al. |
| D628,145 | S | 11/2010 | Vaidya |
| 7,840,210 | B2 | 11/2010 | May |
| 7,843,431 | B2 | 11/2010 | Robbins et al. |
| 7,844,396 | B2 | 11/2010 | Zeitzew |
| 7,853,373 | B2 | 12/2010 | Traster et al. |
| 7,876,927 | B2 | 1/2011 | Han et al. |
| 7,885,738 | B2 | 2/2011 | Park et al. |
| 7,908,834 | B2 | 3/2011 | Keski-Luopa |
| 7,929,504 | B2 | 4/2011 | Wentink et al. |
| 7,953,526 | B2 | 5/2011 | Durkos et al. |
| 7,957,837 | B2 | 6/2011 | Ziegler et al. |
| 7,957,850 | B2 | 6/2011 | Anderson |
| 7,958,709 | B2 | 6/2011 | Coleman et al. |
| 7,958,712 | B2 | 6/2011 | Cheung |
| 7,979,175 | B2 | 7/2011 | Allard et al. |
| 7,992,251 | B2 | 8/2011 | Chung et al. |
| 8,020,657 | B2 | 9/2011 | Allard et al. |
| 8,022,667 | B2 | 9/2011 | Anderson |
| 8,031,086 | B2 | 10/2011 | Thacher et al. |
| 8,046,103 | B2 | 10/2011 | Abramson et al. |
| 8,065,866 | B2 | 11/2011 | Tamas et al. |
| 8,078,338 | B2 | 12/2011 | Pack et al. |
| 8,079,433 | B2 | 12/2011 | Teague et al. |
| D652,431 | S | 1/2012 | Näslund |
| 8,091,105 | B2 | 1/2012 | Lee |
| 8,106,626 | B2 | 1/2012 | Li et al. |
| 8,107,318 | B2 | 1/2012 | Chiappetta et al. |
| 8,108,092 | B2 | 1/2012 | Phillips et al. |
| 8,121,730 | B2 | 2/2012 | Sung et al. |
| D656,163 | S | 3/2012 | Johansson et al. |
| 8,135,498 | B2 | 3/2012 | Hyung et al. |
| 8,150,574 | B2 | 4/2012 | Han et al. |
| 8,195,333 | B2 | 6/2012 | Ziegler et al. |
| 8,195,342 | B2 | 6/2012 | Anderson |
| 8,195,358 | B2 | 6/2012 | Anderson |
| 8,199,109 | B2 | 6/2012 | Robbins et al. |
| 8,200,428 | B2 | 6/2012 | Anderson |
| 8,208,907 | B2 | 6/2012 | May |
| 8,209,053 | B2 | 6/2012 | Kim et al. |
| 8,224,500 | B2 | 7/2012 | Anderson |
| 8,224,516 | B2 | 7/2012 | Anderson |
| 8,229,618 | B2 | 7/2012 | Tolstedt et al. |
| 8,234,010 | B2 | 7/2012 | Thompson et al. |
| 8,234,848 | B2 | 8/2012 | Messina et al. |
| 8,237,389 | B2 | 8/2012 | Fitch et al. |
| 8,239,992 | B2 | 8/2012 | Schnittman et al. |
| 8,255,092 | B2 | 8/2012 | Phillips et al. |
| 8,271,132 | B2 | 9/2012 | Nielsen et al. |
| 8,292,007 | B2 | 10/2012 | Defazio et al. |
| 8,295,125 | B2 | 10/2012 | Chiappetta et al. |
| 8,295,979 | B2 | 10/2012 | Thacher et al. |
| 8,297,032 | B2 | 10/2012 | Ninomiya et al. |
| 8,297,903 | B2 | 10/2012 | Hohmann et al. |
| 8,306,659 | B2 | 11/2012 | Abramson et al. |
| 8,311,674 | B2 | 11/2012 | Abramson |
| 8,326,469 | B2 | 12/2012 | Phillips et al. |
| 8,336,282 | B2 | 12/2012 | Messina et al. |
| 8,340,438 | B2 | 12/2012 | Anderson |
| 8,347,444 | B2 | 1/2013 | Schnittman et al. |
| 8,350,810 | B2 | 1/2013 | Robbins et al. |
| 8,352,113 | B2 | 1/2013 | Johnson et al. |
| 8,370,985 | B2 | 2/2013 | Schnittman et al. |
| 8,390,251 | B2 | 3/2013 | Cohen et al. |
| 8,392,044 | B2 | 3/2013 | Thompson et al. |
| 8,392,065 | B2 | 3/2013 | Tolstedt et al. |
| 8,396,592 | B2 | 3/2013 | Jones et al. |
| 8,396,597 | B2 | 3/2013 | Anderson |
| 8,396,611 | B2 | 3/2013 | Phillips et al. |
| D679,294 | S | 4/2013 | Tajik et al. |
| D679,295 | S | 4/2013 | Tajik et al. |
| 8,412,377 | B2 | 4/2013 | Casey et al. |
| 8,428,776 | B2 | 4/2013 | Letsky |
| 8,433,468 | B2 | 4/2013 | Johnson et al. |
| 8,438,695 | B2 | 5/2013 | Gilbert, Jr. et al. |
| 8,442,700 | B2 | 5/2013 | Anderson |
| 8,447,440 | B2 | 5/2013 | Phillips et al. |
| 8,447,454 | B2 | 5/2013 | Biber et al. |
| 8,461,803 | B2 | 6/2013 | Cohen et al. |
| 8,463,438 | B2 | 6/2013 | Jones et al. |
| 8,467,928 | B2 | 6/2013 | Anderson |
| 8,471,133 | B1 | 6/2013 | Lin |
| 8,473,187 | B2 | 6/2013 | Kammel et al. |
| 8,476,867 | B2 | 7/2013 | Li et al. |
| 8,478,442 | B2 | 7/2013 | Casey et al. |
| 8,498,788 | B2 | 7/2013 | Kondekar |
| D688,276 | S | 8/2013 | Näslund |
| 8,508,329 | B2 | 8/2013 | Veenstra |
| 8,521,329 | B2 | 8/2013 | Park et al. |
| 8,532,821 | B2 | 9/2013 | Ko |
| 8,532,822 | B2 | 9/2013 | Abramson et al. |
| 8,560,145 | B2 | 10/2013 | Anderson |
| 8,565,920 | B2 | 10/2013 | Casey et al. |
| 8,572,266 | B2 | 10/2013 | Larocca |
| 8,577,517 | B2 | 11/2013 | Phillips et al. |
| 8,577,538 | B2 | 11/2013 | Lenser et al. |
| 8,594,842 | B2 | 11/2013 | Abramson |
| 8,599,645 | B2 | 12/2013 | Chiappetta et al. |
| 8,619,141 | B2 | 12/2013 | Anderson |
| 8,634,960 | B2 | 1/2014 | Sandin et al. |
| 8,635,015 | B2 | 1/2014 | Anderson |
| 8,655,539 | B2 | 2/2014 | Yoo et al. |
| 8,660,879 | B2 | 2/2014 | Machtelinck |
| 8,666,550 | B2 | 3/2014 | Anderson et al. |
| 8,666,554 | B2 | 3/2014 | Anderson |
| 8,666,587 | B2 | 3/2014 | Anderson |
| 8,671,656 | B2 | 3/2014 | Paden |
| 8,676,378 | B2 | 3/2014 | Tian et al. |
| 8,706,339 | B2 | 4/2014 | Thompson et al. |
| 8,712,623 | B2 | 4/2014 | Sato et al. |
| 8,725,316 | B2 | 5/2014 | Thompson et al. |
| 8,726,454 | B2 | 5/2014 | Gilbert, Jr. et al. |
| 8,731,295 | B2 | 5/2014 | Schepelmann et al. |
| 8,739,057 | B2 | 5/2014 | Cheong et al. |
| 8,744,626 | B2 | 6/2014 | Johnson et al. |
| 8,744,663 | B2 | 6/2014 | Sato et al. |
| 8,749,196 | B2 | 6/2014 | Cohen et al. |
| 8,760,397 | B2 | 6/2014 | Robbins et al. |
| 8,761,935 | B2 | 6/2014 | Casey et al. |
| 8,781,627 | B2 | 7/2014 | Sandin et al. |
| 8,788,092 | B2 | 7/2014 | Casey et al. |
| 8,818,567 | B2 | 8/2014 | Anderson |
| 8,818,602 | B2 | 8/2014 | Yamamura et al. |
| 8,838,274 | B2 | 9/2014 | Jones et al. |
| 8,838,291 | B2 | 9/2014 | Jägenstedt et al. |
| 8,839,477 | B2 | 9/2014 | Schnittman et al. |
| 8,843,244 | B2 | 9/2014 | Phillips et al. |
| 8,854,001 | B2 | 10/2014 | Cohen et al. |
| 8,856,150 | B2 | 10/2014 | Machtelinck |
| 8,868,237 | B2 | 10/2014 | Sandin et al. |
| 8,869,337 | B2 | 10/2014 | Sumonthee |

(56)          References Cited

U.S. PATENT DOCUMENTS

| | | | |
|---|---|---|---|
| 8,869,369 | B1 | 10/2014 | Roach |
| 8,874,269 | B2 | 10/2014 | Biber et al. |
| 8,874,300 | B2 | 10/2014 | Allard et al. |
| D718,339 | S | 11/2014 | Damshak et al. |
| D718,340 | S | 11/2014 | Damshak et al. |
| D718,341 | S | 11/2014 | Gur et al. |
| 8,892,352 | B2 | 11/2014 | Petereit et al. |
| D718,793 | S | 12/2014 | Gur et al. |
| 8,911,192 | B2 | 12/2014 | Hohmann et al. |
| 8,918,241 | B2 | 12/2014 | Chen et al. |
| 8,925,667 | B2 | 1/2015 | Chen |
| 8,930,023 | B2 | 1/2015 | Gutmann et al. |
| 8,930,024 | B2 | 1/2015 | Abramson |
| 8,938,318 | B2 | 1/2015 | Bergström et al. |
| 8,942,862 | B2 | 1/2015 | Markusson et al. |
| 8,954,193 | B2 | 2/2015 | Sandin et al. |
| 8,958,911 | B2 | 2/2015 | Wong et al. |
| 8,958,939 | B2 | 2/2015 | Einecke et al. |
| 8,965,578 | B2 | 2/2015 | Versteeg et al. |
| 8,989,946 | B2 | 3/2015 | Anderson |
| 8,989,972 | B2 | 3/2015 | Anderson |
| 8,996,171 | B2 | 3/2015 | Anderson et al. |
| 8,996,177 | B2 | 3/2015 | Coenen |
| D729,280 | S | 5/2015 | Näslund et al. |
| 9,021,777 | B2 | 5/2015 | Johnson et al. |
| 9,026,299 | B2 | 5/2015 | Johnson et al. |
| 9,026,302 | B2 | 5/2015 | Stout et al. |
| 9,031,050 | B2 | 5/2015 | Cherian et al. |
| 9,037,294 | B2 | 5/2015 | Chung et al. |
| 9,043,016 | B2 | 5/2015 | Filippov et al. |
| 9,043,129 | B2 | 5/2015 | Bonefas et al. |
| D731,402 | S | 6/2015 | Tedesco et al. |
| 9,043,952 | B2 | 6/2015 | Sandin et al. |
| 9,043,953 | B2 | 6/2015 | Sandin et al. |
| 9,072,218 | B2 | 7/2015 | Johnson et al. |
| 9,072,219 | B2 | 7/2015 | Da Rocha et al. |
| 9,079,303 | B2 | 7/2015 | Abramson et al. |
| 9,093,868 | B2 | 7/2015 | Baxter |
| 9,104,204 | B2 | 8/2015 | Jones et al. |
| 9,104,206 | B2 | 8/2015 | Biber et al. |
| 9,110,471 | B2 | 8/2015 | Pack et al. |
| 9,113,595 | B2 | 8/2015 | Roth et al. |
| 9,119,341 | B2 | 9/2015 | Jägenstedt |
| 9,137,943 | B2 | 9/2015 | Einecke et al. |
| 9,144,193 | B2 | 9/2015 | Paden |
| 9,182,763 | B2 | 11/2015 | Park et al. |
| 9,186,800 | B2 | 11/2015 | Shin et al. |
| 9,188,980 | B2 | 11/2015 | Anderson |
| 9,188,983 | B2 | 11/2015 | Stout et al. |
| 9,195,256 | B2 | 11/2015 | Robbins et al. |
| D745,897 | S | 12/2015 | Mehra et al. |
| 9,213,934 | B1 | 12/2015 | Versteeg et al. |
| 9,215,957 | B2 | 12/2015 | Cohen et al. |
| 9,223,312 | B2 | 12/2015 | Goel et al. |
| 9,232,692 | B2 | 1/2016 | Björn et al. |
| 9,235,214 | B2 | 1/2016 | Anderson |
| 9,236,637 | B2 | 1/2016 | Anderson |
| 9,241,441 | B2 | 1/2016 | Björn et al. |
| D748,568 | S | 2/2016 | Helin et al. |
| 9,258,942 | B2 | 2/2016 | Biber et al. |
| 9,268,331 | B2 | 2/2016 | Abramson et al. |
| 9,276,419 | B2 | 3/2016 | Borinato et al. |
| 9,278,690 | B2 | 3/2016 | Smith |
| 9,301,444 | B2 | 4/2016 | Campbell et al. |
| D757,637 | S | 5/2016 | Horowitz |
| 9,327,407 | B2 | 5/2016 | Jones et al. |
| 9,335,767 | B2 | 5/2016 | Jang et al. |
| 9,338,130 | B2 | 5/2016 | Von Huben et al. |
| 9,348,897 | B2 | 5/2016 | Shoham et al. |
| 9,349,187 | B2 | 5/2016 | Schepelmann et al. |
| D758,455 | S | 6/2016 | Maibach et al. |
| D759,577 | S | 6/2016 | Wang et al. |
| 9,357,699 | B2 | 6/2016 | Elonsson |
| 9,363,945 | B2 | 6/2016 | Jägenstedt et al. |
| 9,375,842 | B2 | 6/2016 | Shamlian et al. |
| 9,376,027 | B2 | 6/2016 | Harris |
| D760,806 | S | 7/2016 | Cmich et al. |
| 9,380,742 | B2 | 7/2016 | Biber et al. |
| 9,405,294 | B2 | 8/2016 | Jägenstedt et al. |
| 9,412,515 | B2 | 8/2016 | Hyde et al. |
| 9,419,453 | B2 | 8/2016 | Andersson et al. |
| 9,420,741 | B2 | 8/2016 | Balutis et al. |
| 9,421,879 | B2 | 8/2016 | Pastoor et al. |
| 9,426,946 | B2 | 8/2016 | Fisher |
| 9,429,950 | B2 | 8/2016 | Sjöholm |
| 9,436,185 | B2 | 9/2016 | Schnittman |
| 9,439,348 | B2 | 9/2016 | Biber et al. |
| 9,439,367 | B2 | 9/2016 | Abhyanker |
| 9,440,350 | B2 | 9/2016 | Mou et al. |
| 9,440,354 | B2 | 9/2016 | Gutmann et al. |
| 9,446,521 | B2 | 9/2016 | Casey et al. |
| 9,452,525 | B2 | 9/2016 | Ziegler et al. |
| 9,452,685 | B2 | 9/2016 | Hyde et al. |
| D769,180 | S | 10/2016 | Wang et al. |
| 9,456,545 | B2 | 10/2016 | Biber |
| 9,457,677 | B2 | 10/2016 | Hyde et al. |
| 9,463,704 | B2 | 10/2016 | Hyde et al. |
| 9,471,063 | B2 | 10/2016 | Ouyang |
| 9,480,201 | B2 | 11/2016 | Maruyama et al. |
| 9,483,055 | B2 | 11/2016 | Johnson et al. |
| 9,491,904 | B2 | 11/2016 | Jägenstedt et al. |
| 9,497,901 | B2 | 11/2016 | Willgert |
| 9,505,140 | B1 | 11/2016 | Fay et al. |
| 9,510,505 | B2 | 12/2016 | Halloran et al. |
| 9,516,806 | B2 | 12/2016 | Yamauchi et al. |
| D776,169 | S | 1/2017 | Cmich et al. |
| 9,532,688 | B1 | 1/2017 | Ebrahimi Afrouzi et al. |
| 9,538,702 | B2 | 1/2017 | Balutis et al. |
| 9,543,680 | B2 | 1/2017 | Elonsson |
| 9,545,032 | B2 | 1/2017 | Baer et al. |
| 9,550,294 | B2 | 1/2017 | Cohen et al. |
| 9,554,508 | B2 | 1/2017 | Balutis et al. |
| 9,559,461 | B1 | 1/2017 | Diehr |
| 9,560,800 | B2 | 2/2017 | Reichen et al. |
| 9,563,204 | B2 | 2/2017 | Willgert |
| 9,573,275 | B2 | 2/2017 | Reigo et al. |
| D781,349 | S | 3/2017 | Cmich |
| D781,926 | S | 3/2017 | Al-hashimi et al. |
| 9,586,563 | B2 | 3/2017 | Kanai et al. |
| 9,590,862 | B2 | 3/2017 | Larocca |
| 9,606,541 | B2 | 3/2017 | Abramson |
| 9,622,399 | B2 | 4/2017 | Kremmer et al. |
| 9,623,557 | B2 | 4/2017 | Gutmann et al. |
| 9,630,319 | B2 | 4/2017 | Vicenti |
| 9,632,489 | B2 | 4/2017 | Biber et al. |
| 9,699,964 | B2 | 7/2017 | Roth et al. |
| 9,701,020 | B1 | 7/2017 | Ebrahimi Afrouzi |
| 9,711,767 | B2 | 7/2017 | Juenger et al. |
| 9,713,302 | B2 | 7/2017 | Sandin et al. |
| 9,713,303 | B2 | 7/2017 | Jägenstedt et al. |
| D794,089 | S | 8/2017 | Maibach et al. |
| 9,717,175 | B2 | 8/2017 | Fay, II et al. |
| 9,720,417 | B2 | 8/2017 | Reigo et al. |
| 9,723,782 | B2 | 8/2017 | Roth et al. |
| 9,736,981 | B2 | 8/2017 | Roth et al. |
| 9,740,210 | B2 | 8/2017 | Sjöholm |
| D796,555 | S | 9/2017 | Landberg et al. |
| D797,530 | S | 9/2017 | Cmich |
| 9,750,183 | B2 | 9/2017 | Haun |
| 9,766,627 | B2 | 9/2017 | Jägenstedt et al. |
| D799,555 | S | 10/2017 | Cmich |
| 9,785,148 | B2 | 10/2017 | Yun |
| 9,788,481 | B2 | 10/2017 | Das et al. |
| 9,788,483 | B2 | 10/2017 | Roth et al. |
| 9,791,860 | B2 | 10/2017 | Phillips et al. |
| 9,804,604 | B2 | 10/2017 | Mattsson et al. |
| 9,807,925 | B2 | 11/2017 | Johnson |
| 9,807,930 | B1 | 11/2017 | Lydon et al. |
| 9,817,398 | B2 | 11/2017 | Yamamura et al. |
| 9,820,433 | B2 | 11/2017 | Borinato |
| 9,826,678 | B2 | 11/2017 | Balutis et al. |
| 9,829,891 | B2 | 11/2017 | Smith et al. |
| 9,841,768 | B2 | 12/2017 | Hiramatsu et al. |
| 9,844,876 | B2 | 12/2017 | Chung et al. |

(56) References Cited

U.S. PATENT DOCUMENTS

| | | | |
|---|---|---|---|
| 9,848,529 | B2 | 12/2017 | Franzius et al. |
| 9,848,532 | B2 | 12/2017 | Keski-Luopa et al. |
| 9,851,718 | B2 | 12/2017 | Booher |
| 9,853,468 | B2 | 12/2017 | Ireland |
| D807,281 | S | 1/2018 | Irwin et al. |
| D807,811 | S | 1/2018 | Wang et al. |
| 9,854,737 | B2 | 1/2018 | Yamauchi et al. |
| 9,854,956 | B2 | 1/2018 | Song et al. |
| 9,857,025 | B2 | 1/2018 | Gottinger et al. |
| 9,861,035 | B2 | 1/2018 | Kruckeberg et al. |
| 9,872,437 | B2 | 1/2018 | Markusson et al. |
| 9,874,876 | B2 | 1/2018 | Shimamura |
| 9,876,370 | B2 | 1/2018 | Yamamura et al. |
| D810,664 | S | 2/2018 | Sgreccia et al. |
| D810,665 | S | 2/2018 | Sgreccia et al. |
| 9,884,423 | B2 | 2/2018 | Cohen et al. |
| 9,894,836 | B2 | 2/2018 | Garton |
| 9,895,808 | B2 | 2/2018 | Stout et al. |
| 9,901,028 | B2 | 2/2018 | Hans |
| 9,903,947 | B2 | 2/2018 | Das et al. |
| 9,924,632 | B2 | 3/2018 | Chenevert et al. |
| 9,924,847 | B2 | 3/2018 | Gottinger et al. |
| 9,931,007 | B2 | 4/2018 | Morin et al. |
| 9,931,008 | B2 | 4/2018 | Yoo et al. |
| 9,931,750 | B2 | 4/2018 | Cohen et al. |
| 9,936,635 | B2 | 4/2018 | Gottinger et al. |
| 9,968,024 | B2 | 5/2018 | Haneda et al. |
| 9,972,098 | B1 | 5/2018 | Ebrahimi Afrouzi et al. |
| 9,983,586 | B2 | 5/2018 | Borinato |
| 10,011,180 | B2 | 7/2018 | Hyde et al. |
| 10,021,830 | B2 | 7/2018 | Doughty |
| 10,024,964 | B2 | 7/2018 | Pierce et al. |
| 10,029,368 | B2 | 7/2018 | Wolowelsky et al. |
| 10,031,527 | B2 | 7/2018 | Björn |
| 10,034,421 | B2 | 7/2018 | Doughty et al. |
| 10,035,270 | B2 | 7/2018 | Fay et al. |
| 10,037,038 | B2 | 7/2018 | Sandin et al. |
| 10,046,130 | B2 | 8/2018 | Molden et al. |
| 10,054,924 | B2 | 8/2018 | Willgert |
| 10,057,813 | B1 | 8/2018 | Likar et al. |
| 10,067,232 | B2 | 9/2018 | Halloran et al. |
| 10,070,764 | B2 | 9/2018 | Schnittman et al. |
| 10,071,475 | B2 | 9/2018 | Lin et al. |
| 10,078,336 | B2 | 9/2018 | Reigo et al. |
| 10,080,326 | B2 | 9/2018 | Yamamura et al. |
| D830,418 | S | 10/2018 | Näslund et al. |
| 10,091,930 | B2 | 10/2018 | Balutis et al. |
| 10,093,194 | B2 | 10/2018 | Hyde et al. |
| 10,093,259 | B2 | 10/2018 | Pan |
| 10,098,277 | B2 | 10/2018 | Ouyang |
| 10,104,835 | B2 | 10/2018 | Köhler et al. |
| 10,105,838 | B2 | 10/2018 | Mou et al. |
| 10,108,198 | B2 | 10/2018 | Björn et al. |
| D834,185 | S | 11/2018 | Molden et al. |
| D834,504 | S | 11/2018 | Ropars |
| D834,505 | S | 11/2018 | Wang et al. |
| 10,117,379 | B2 | 11/2018 | Guiet et al. |
| 10,123,479 | B2 | 11/2018 | Ladd, Jr. et al. |
| 10,124,494 | B2 | 11/2018 | Outa et al. |
| 10,131,057 | B2 | 11/2018 | Patel et al. |
| 10,136,576 | B2 | 11/2018 | Reigo |
| 10,149,430 | B2 | 12/2018 | Bergström et al. |
| 10,152,062 | B2 | 12/2018 | Schnittman |
| 10,157,334 | B2 | 12/2018 | Schepelmann et al. |
| 10,159,180 | B2 | 12/2018 | Balutis et al. |
| 10,162,359 | B2 | 12/2018 | Johnson et al. |
| D837,150 | S | 1/2019 | Näslund et al. |
| 10,165,725 | B2 | 1/2019 | Sugumaran et al. |
| 10,172,282 | B2 | 1/2019 | Svensson et al. |
| 10,178,826 | B2 | 1/2019 | Jägenstedt et al. |
| 10,183,400 | B2 | 1/2019 | Trigui et al. |
| 10,183,701 | B2 | 1/2019 | Ebrahimi Afrouzi et al. |
| 10,185,325 | B2 | 1/2019 | Reigo et al. |
| 10,201,261 | B2 | 2/2019 | Tanaka et al. |
| 10,207,557 | B2 | 2/2019 | Björn et al. |
| 10,212,880 | B2 | 2/2019 | Cmich et al. |
| 10,238,026 | B2 | 3/2019 | Köhler et al. |
| D845,877 | S | 4/2019 | Geng et al. |
| 10,244,678 | B2 | 4/2019 | Lydon et al. |
| 10,246,907 | B2 | 4/2019 | Shen |
| 10,257,976 | B2 | 4/2019 | Ladd, Jr. et al. |
| 10,259,498 | B2 | 4/2019 | Jägenstedt et al. |
| 10,268,206 | B2 | 4/2019 | Yamamura |
| 10,274,954 | B2 | 4/2019 | Balutis et al. |
| D848,488 | S | 5/2019 | Cmich |
| 10,281,912 | B2 | 5/2019 | Hollister |
| 10,281,922 | B2 | 5/2019 | Smith et al. |
| 10,299,431 | B2 | 5/2019 | Ladd, Jr. et al. |
| 10,299,652 | B2 | 5/2019 | Gilbert, Jr. et al. |
| D852,232 | S | 6/2019 | Eidson et al. |
| 10,310,510 | B2 | 6/2019 | Mannefred et al. |
| 10,315,306 | B2 | 6/2019 | Abramson |
| 10,321,625 | B2 | 6/2019 | Einecke et al. |
| 10,327,384 | B2 | 6/2019 | Johansson et al. |
| D853,447 | S | 7/2019 | Mehra et al. |
| D853,448 | S | 7/2019 | Mehra et al. |
| D853,449 | S | 7/2019 | Mehra et al. |
| 10,338,602 | B2 | 7/2019 | Grufman et al. |
| 10,343,280 | B1 | 7/2019 | Ebrahimi Afrouzi |
| 10,346,995 | B1 | 7/2019 | Ebrahimi Afrouzi |
| 10,353,399 | B2 | 7/2019 | Ebrahimi Afrouzi |
| 10,362,730 | B2 | 7/2019 | Ladd, Jr. et al. |
| 10,365,661 | B2 | 7/2019 | Jägenstedt et al. |
| 10,369,705 | B2 | 8/2019 | Trigui et al. |
| 10,372,140 | B2 | 8/2019 | Sun et al. |
| 10,375,880 | B2 | 8/2019 | Morin et al. |
| 10,377,035 | B2 | 8/2019 | He et al. |
| 10,379,172 | B2 | 8/2019 | Kleiner et al. |
| 10,384,346 | B2 | 8/2019 | Hickman et al. |
| 10,386,844 | B2 | 8/2019 | Wilcox et al. |
| 10,390,483 | B2 | 8/2019 | Balutis et al. |
| D858,424 | S | 9/2019 | Chattopadhyay |
| 10,405,488 | B2 | 9/2019 | Kamfors et al. |
| 10,425,488 | B2 | 9/2019 | Larsén et al. |
| D864,256 | S | 10/2019 | Eidson et al. |
| 10,426,083 | B2 | 10/2019 | Doughty |
| 10,440,879 | B2 | 10/2019 | Björn et al. |
| 10,442,083 | B2 | 10/2019 | Wolowelsky et al. |
| 10,444,756 | B2 | 10/2019 | Kamfors et al. |
| 10,444,757 | B2 | 10/2019 | Dong et al. |
| 10,444,760 | B2 | 10/2019 | Grufman et al. |
| 10,448,565 | B2 | 10/2019 | Mannefred et al. |
| 10,454,287 | B2 | 10/2019 | Yamamura et al. |
| 10,456,924 | B2 | 10/2019 | Outa et al. |
| 10,459,452 | B2 | 10/2019 | Eagling et al. |
| 10,462,961 | B2 | 11/2019 | Tjernberg et al. |
| 10,463,215 | B2 | 11/2019 | Morin et al. |
| 10,464,206 | B2 | 11/2019 | Frisby et al. |
| 10,466,710 | B2 | 11/2019 | Biber et al. |
| 10,485,164 | B2 | 11/2019 | Letsky |
| 10,488,865 | B2 | 11/2019 | Afrouzi et al. |
| 10,496,262 | B1 | 12/2019 | Ebrahimi Afrouzi et al. |
| 10,500,722 | B2 | 12/2019 | Vicenti |
| 10,514,701 | B2 | 12/2019 | Windorfer |
| 10,517,211 | B2 | 12/2019 | Öhrlund et al. |
| 10,518,651 | B2 | 12/2019 | Svensson et al. |
| 10,520,113 | B1 | 12/2019 | Thompson |
| 10,542,667 | B2 | 1/2020 | Song et al. |
| 10,542,670 | B2 | 1/2020 | Cmich et al. |
| 10,549,646 | B2 | 2/2020 | Reynolds et al. |
| 10,551,844 | B2 | 2/2020 | Biber et al. |
| 10,552,770 | B2 | 2/2020 | Brough et al. |
| 10,555,456 | B2 | 2/2020 | Borinato |
| 10,555,457 | B2 | 2/2020 | Song et al. |
| 10,561,063 | B2 | 2/2020 | Hasegawa et al. |
| 10,568,258 | B2 | 2/2020 | Wahlgren |
| 10,571,905 | B2 | 2/2020 | Yamamura |
| 10,571,928 | B2 | 2/2020 | Sun et al. |
| 10,575,465 | B2 | 3/2020 | Ran et al. |
| 10,575,696 | B2 | 3/2020 | O'Brien et al. |
| 10,583,562 | B2 | 3/2020 | Stout et al. |
| 10,588,255 | B2 | 3/2020 | Song et al. |
| 10,589,418 | B2 | 3/2020 | Gordon-Carroll et al. |
| 10,589,432 | B2 | 3/2020 | Al Nahwi et al. |

(56) References Cited

U.S. PATENT DOCUMENTS

| | | | |
|---|---|---|---|
| 10,589,433 | B2 | 3/2020 | Al Nahwi et al. |
| 10,592,998 | B2 | 3/2020 | Eijdenberg et al. |
| 10,594,117 | B2 | 3/2020 | Song et al. |
| 10,595,459 | B2 | 3/2020 | Aposhian et al. |
| 10,595,692 | B2 | 3/2020 | Morin et al. |
| 10,598,793 | B2 | 3/2020 | Öhrlund et al. |
| 10,599,154 | B2 | 3/2020 | Dean et al. |
| 10,606,275 | B2 | 3/2020 | Dean et al. |
| 10,606,279 | B2 | 3/2020 | Grufman et al. |
| D880,532 | S | 4/2020 | Gunnarsson et al. |
| D881,252 | S | 4/2020 | Vestberg et al. |
| D882,640 | S | 4/2020 | Estey |
| 10,609,862 | B2 | 4/2020 | Wu et al. |
| 10,611,028 | B1 | 4/2020 | Zhou et al. |
| 10,612,929 | B2 | 4/2020 | Afrouzi et al. |
| 10,613,541 | B1 | 4/2020 | Ebrahimi Afrouzi et al. |
| 10,621,537 | B2 | 4/2020 | Ben-Alexander |
| D884,762 | S | 5/2020 | Gunnarsson et al. |
| D884,763 | S | 5/2020 | Gunnarsson et al. |
| 10,643,377 | B2 | 5/2020 | Grufman et al. |
| 10,646,997 | B2 | 5/2020 | Reigo et al. |
| 10,649,466 | B2 | 5/2020 | Holmström et al. |
| 10,651,594 | B1 | 5/2020 | Tsai et al. |
| 10,653,057 | B2 | 5/2020 | Choi et al. |
| 10,653,058 | B2 | 5/2020 | Yamanaka et al. |
| 10,653,282 | B2 | 5/2020 | Song et al. |
| 10,656,652 | B2 | 5/2020 | Dean et al. |
| D887,464 | S | 6/2020 | Gunnarsson et al. |
| D887,465 | S | 6/2020 | Gunnarsson et al. |
| D887,466 | S | 6/2020 | Gunnarsson et al. |
| 10,670,406 | B2 | 6/2020 | Eguchi et al. |
| 10,673,630 | B2 | 6/2020 | Pakkan et al. |
| 10,674,659 | B2 | 6/2020 | Ladd, Jr. et al. |
| 10,674,660 | B2 | 6/2020 | Matsuzawa et al. |
| 10,681,863 | B2 | 6/2020 | Hans et al. |
| 10,681,864 | B2 | 6/2020 | Matt et al. |
| 10,691,000 | B2 | 6/2020 | Du et al. |
| 10,698,417 | B2 | 6/2020 | Churavy et al. |
| D889,517 | S | 7/2020 | Prybor et al. |
| 10,716,258 | B2 | 7/2020 | Pellenc et al. |
| 10,721,860 | B2 | 7/2020 | Liljedahl |
| D892,187 | S | 8/2020 | Maggard |
| 10,737,369 | B2 | 8/2020 | Steinhauser et al. |
| 10,737,395 | B2 | 8/2020 | Wolff et al. |
| 10,738,495 | B2 | 8/2020 | Durvasula et al. |
| 10,739,769 | B2 | 8/2020 | Dean et al. |
| 10,747,413 | B2 | 8/2020 | Schneider et al. |
| 10,750,667 | B2 | 8/2020 | Yamauchi et al. |
| 10,750,918 | B2 | 8/2020 | Jung et al. |
| D896,737 | S | 9/2020 | Phely |
| 10,758,100 | B2 | 9/2020 | Cohen et al. |
| 10,765,284 | B2 | 9/2020 | Song et al. |
| 10,766,147 | B2 | 9/2020 | Trigui et al. |
| 10,777,000 | B2 | 9/2020 | Grufman et al. |
| 10,782,705 | B2 | 9/2020 | Reigo et al. |
| 10,785,907 | B2 | 9/2020 | Doughty et al. |
| 10,788,832 | B2 | 9/2020 | Nykamp |
| 10,791,684 | B2 | 10/2020 | He et al. |
| 10,795,377 | B2 | 10/2020 | Afrouzi et al. |
| 10,806,075 | B2 | 10/2020 | Grufman et al. |
| 10,809,071 | B2 | 10/2020 | Afrouzi et al. |
| 10,809,740 | B2 | 10/2020 | Reinert et al. |
| 10,814,495 | B2 | 10/2020 | Patel et al. |
| 10,820,493 | B2 | 11/2020 | Ritzer et al. |
| 10,824,163 | B2 | 11/2020 | Einecke et al. |
| 10,842,074 | B2 | 11/2020 | Jägenstedt et al. |
| 10,843,734 | B1 | 11/2020 | Ebrahimi Afrouzi et al. |
| 10,843,735 | B1 | 11/2020 | Ebrahimi Afrouzi et al. |
| 10,845,481 | B2 | 11/2020 | Pierce et al. |
| 10,845,804 | B2 | 11/2020 | Holgersson et al. |
| D906,373 | S | 12/2020 | Morin et al. |
| 10,849,267 | B2 | 12/2020 | Strandberg et al. |
| 10,849,270 | B2 | 12/2020 | Johansson et al. |
| 10,850,400 | B2 | 12/2020 | Park |
| 10,852,735 | B2 | 12/2020 | Tan et al. |
| 10,852,738 | B2 | 12/2020 | Mannefred et al. |
| 10,856,467 | B2 | 12/2020 | Maggard |
| 10,858,041 | B2 | 12/2020 | Jägenstedt et al. |
| 10,869,432 | B2 | 12/2020 | Wykman et al. |
| 10,873,194 | B2 | 12/2020 | Lydon et al. |
| 10,874,045 | B2 | 12/2020 | Balutis et al. |
| 10,874,049 | B2 | 12/2020 | Ladd, Jr. et al. |
| 10,874,051 | B2 | 12/2020 | Kasai et al. |
| 10,874,278 | B2 | 12/2020 | Matt et al. |
| D908,597 | S | 1/2021 | Meng et al. |
| D908,598 | S | 1/2021 | Meng et al. |
| 10,882,187 | B2 | 1/2021 | Li et al. |
| 10,888,046 | B2 | 1/2021 | Gorenflo et al. |
| 10,890,921 | B2 | 1/2021 | Gillett |
| 10,895,876 | B2 | 1/2021 | Arenz et al. |
| 10,899,171 | B2 | 1/2021 | Cmich |
| 10,912,253 | B2 | 2/2021 | Einecke et al. |
| 10,928,833 | B2 | 2/2021 | Reigo |
| 10,932,409 | B2 | 3/2021 | Ingvalson et al. |
| 10,935,383 | B1 | 3/2021 | Ebrahimi Afrouzi et al. |
| 10,939,611 | B2 | 3/2021 | Liljedahl |
| 10,952,578 | B2 | 3/2021 | Gill et al. |
| 10,959,371 | B2 | 3/2021 | Zhou et al. |
| 10,966,368 | B2 | 4/2021 | Desai et al. |
| 10,967,752 | B2 | 4/2021 | Liu et al. |
| 10,973,168 | B2 | 4/2021 | Hans et al. |
| 10,986,775 | B2 | 4/2021 | Matt et al. |
| 10,986,971 | B1 | 4/2021 | Ebrahimi Afrouzi |
| 10,993,598 | B2 | 5/2021 | Park et al. |
| 11,003,192 | B2 | 5/2021 | Dalfra et al. |
| 11,009,869 | B2 | 5/2021 | Moroi et al. |
| 11,013,655 | B1 | 5/2021 | Ebrahimi Afrouzi et al. |
| 11,014,460 | B2 | 5/2021 | Schnittman et al. |
| 11,016,481 | B2 | 5/2021 | Gustavsson et al. |
| D922,444 | S | 6/2021 | Morin et al. |
| 11,019,975 | B2 | 6/2021 | Jang et al. |
| 11,020,857 | B2 | 6/2021 | Xiong et al. |
| 11,039,582 | B2 | 6/2021 | Gilliam et al. |
| 11,039,583 | B2 | 6/2021 | Gilliam et al. |
| 11,044,844 | B2 | 6/2021 | Keski-Luopa et al. |
| 11,048,268 | B2 | 6/2021 | Ouyang |
| 11,051,449 | B2 | 7/2021 | Bergh et al. |
| 11,051,671 | B2 | 7/2021 | Jang et al. |
| 11,052,535 | B2 | 7/2021 | Parks, II et al. |
| 11,052,540 | B2 | 7/2021 | Stout et al. |
| 11,054,822 | B2 | 7/2021 | Özmen |
| 11,054,836 | B2 | 7/2021 | Wang et al. |
| 11,058,053 | B2 | 7/2021 | Patel et al. |
| 11,064,652 | B2 | 7/2021 | Matt et al. |
| 11,065,762 | B2 | 7/2021 | Sakai et al. |
| 11,069,082 | B1 | 7/2021 | Ebrahimi Afrouzi et al. |
| 11,071,429 | B2 | 7/2021 | Jang et al. |
| 11,072,250 | B2 | 7/2021 | Gilbert, Jr. et al. |
| 11,072,255 | B2 | 7/2021 | Svensson et al. |
| 11,075,910 | B2 | 7/2021 | Dean et al. |
| 11,076,529 | B2 | 8/2021 | Chen et al. |
| 11,079,755 | B2 | 8/2021 | Schlacks, IV et al. |
| 11,084,172 | B2 | 8/2021 | Casey et al. |
| 11,089,732 | B2 | 8/2021 | Jägenstedt et al. |
| 11,097,428 | B2 | 8/2021 | Al Nahwi et al. |
| 11,099,572 | B2 | 8/2021 | Cestonaro et al. |
| 11,104,006 | B2 | 8/2021 | Fay et al. |
| 11,105,109 | B2 | 8/2021 | Durvasula et al. |
| 11,106,215 | B2 | 8/2021 | Dalfra |
| 11,109,528 | B2 | 9/2021 | Strang |
| 11,109,731 | B2 | 9/2021 | Jang et al. |
| 11,112,505 | B2 | 9/2021 | Öhrlund et al. |
| 11,112,532 | B2 | 9/2021 | Jägenstedt et al. |
| 11,115,798 | B2 | 9/2021 | Beaulieu et al. |
| 11,117,264 | B2 | 9/2021 | Tsai et al. |
| 11,119,496 | B1 | 9/2021 | Ebrahimi Afrouzi et al. |
| 11,126,193 | B2 | 9/2021 | Mannefred et al. |
| 11,134,609 | B2 | 10/2021 | Willgert et al. |
| 11,140,815 | B2 | 10/2021 | Matt et al. |
| 11,140,819 | B2 | 10/2021 | Chen et al. |
| 11,141,034 | B2 | 10/2021 | Jang et al. |
| 11,154,006 | B2 | 10/2021 | Liljedahl |
| 11,154,442 | B1 | 10/2021 | Dean et al. |
| 11,157,015 | B2 | 10/2021 | Schnittman |

(56) References Cited

U.S. PATENT DOCUMENTS

| | | | |
|---|---|---|---|
| D937,181 S | 11/2021 | Guidry |
| 11,161,235 B2 | 11/2021 | He et al. |
| 11,161,381 B2 | 11/2021 | Svensson et al. |
| 11,161,422 B2 | 11/2021 | Andriolo et al. |
| 11,161,578 B2 | 11/2021 | Wu et al. |
| 11,163,292 B2 | 11/2021 | Adler et al. |
| 11,166,411 B2 | 11/2021 | Fuse et al. |
| 11,169,527 B2 | 11/2021 | Dalfra |
| 11,169,530 B1 | 11/2021 | Ärlig et al. |
| 11,171,497 B2 | 11/2021 | Jiao et al. |
| 11,173,594 B2 | 11/2021 | Kim |
| 11,175,374 B2 | 11/2021 | Kameyama et al. |
| 11,191,403 B2 | 12/2021 | Gill et al. |
| 11,197,414 B2 | 12/2021 | Zeiler et al. |
| 11,199,853 B1 | 12/2021 | Afrouzi et al. |
| 11,202,547 B2 | 12/2021 | Jang et al. |
| 11,215,461 B1 | 1/2022 | Ebrahimi Afrouzi et al. |
| 11,221,628 B2 | 1/2022 | Holgersson et al. |
| 11,225,228 B2 | 1/2022 | Liu et al. |
| 11,229,154 B2 | 1/2022 | Hershbarger |
| 11,231,708 B2 | 1/2022 | Hyakusawa |
| D943,638 S | 2/2022 | Rauch et al. |
| 11,235,451 B2 | 2/2022 | Bombulie |
| 11,235,472 B2 | 2/2022 | Al Nahwi et al. |
| 11,253,126 B2 | 2/2022 | Jang et al. |
| 11,260,765 B2 | 3/2022 | Namiki et al. |
| 11,269,349 B2 | 3/2022 | Shao et al. |
| 11,274,929 B1 | 3/2022 | Afrouzi et al. |
| 11,278,176 B2 | 3/2022 | Huang et al. |
| 11,278,177 B2 | 3/2022 | Lin et al. |
| 11,284,766 B2 | 3/2022 | Jang et al. |
| 11,287,821 B2 | 3/2022 | Borinato |
| 11,287,832 B2 | 3/2022 | Ebrahimi Afrouzi |
| 11,291,343 B2 | 4/2022 | Jang et al. |
| 11,292,136 B2 | 4/2022 | Wolff et al. |
| 11,298,831 B2 | 4/2022 | Tsai et al. |
| 11,300,975 B2 | 4/2022 | Dalfra et al. |
| 11,320,828 B1 | 5/2022 | Ebrahimi Afrouzi et al. |
| 11,325,590 B2 | 5/2022 | Han et al. |
| 11,340,079 B1 | 5/2022 | Ebrahimi Afrouzi et al. |
| 11,347,230 B2 | 5/2022 | Wang et al. |
| 11,351,670 B2 | 6/2022 | Wolowelsky et al. |
| 11,357,166 B2 | 6/2022 | Hahn et al. |
| 11,357,167 B2 | 6/2022 | Aposhian et al. |
| 11,378,979 B2 | 7/2022 | Zhou et al. |
| 11,380,320 B2 | 7/2022 | Duncan |
| 11,393,114 B1 | 7/2022 | Ebrahimi Afrouzi et al. |
| 11,415,998 B2 | 8/2022 | Strandberg |
| 11,464,164 B2 | 10/2022 | Cmich et al. |
| 11,596,117 B2 | 3/2023 | Koehler et al. |
| 11,614,744 B2 | 3/2023 | Ran et al. |
| 11,654,574 B2 | 5/2023 | Zhang et al. |
| 11,662,723 B2 | 5/2023 | Schlacks, IV et al. |
| 2002/0005237 A1 | 1/2002 | Musat et al. |
| 2003/0144774 A1 | 7/2003 | Trissel et al. |
| 2003/0218046 A1 | 11/2003 | Peter, Jr. |
| 2003/0236590 A1 | 12/2003 | Park et al. |
| 2004/0000823 A1 | 1/2004 | Patridge |
| 2004/0158358 A1 | 8/2004 | Anezaki et al. |
| 2004/0187457 A1 | 9/2004 | Colens |
| 2004/0190376 A1 | 9/2004 | Hulden et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0010331 A1 | 1/2005 | Taylor et al. |
| 2005/0028346 A1 | 2/2005 | Mangone |
| 2005/0034437 A1 | 2/2005 | McMurtry et al. |
| 2005/0039428 A1 | 2/2005 | McMurtry et al. |
| 2005/0042059 A1 | 2/2005 | Bremer |
| 2005/0060975 A1 | 3/2005 | McClymonds |
| 2005/0171637 A1 | 8/2005 | Tani et al. |
| 2005/0171644 A1 | 8/2005 | Tani |
| 2005/0273967 A1 | 12/2005 | Taylor et al. |
| 2006/0010844 A1 | 1/2006 | Angott |
| 2006/0020369 A1 | 1/2006 | Taylor et al. |
| 2006/0020370 A1 | 1/2006 | Abramson |
| 2006/0191096 A1 | 8/2006 | Sudo et al. |
| 2006/0212191 A1 | 9/2006 | Saeki |
| 2006/0217854 A1 | 9/2006 | Takenaka et al. |
| 2006/0219838 A1 | 10/2006 | Audet |
| 2007/0100496 A1 | 5/2007 | Forell |
| 2007/0119137 A1 | 5/2007 | Brandon |
| 2007/0142972 A1 | 6/2007 | Abramson et al. |
| 2007/0143949 A1 | 6/2007 | Chiu |
| 2007/0145943 A1 | 6/2007 | Sudo |
| 2007/0150109 A1 | 6/2007 | Peless et al. |
| 2007/0234698 A1 | 10/2007 | Silbernagel et al. |
| 2007/0276541 A1 | 11/2007 | Sawasaki |
| 2008/0143065 A1 | 6/2008 | Defazio et al. |
| 2008/0163117 A1 | 7/2008 | Machtelinck et al. |
| 2008/0167753 A1 | 7/2008 | Peless et al. |
| 2008/0281470 A1 | 11/2008 | Gilbert, Jr. et al. |
| 2008/0294288 A1 | 11/2008 | Yamauchi |
| 2009/0112679 A1 | 4/2009 | Machtelinck |
| 2009/0157259 A1 | 6/2009 | Han et al. |
| 2009/0182464 A1 | 7/2009 | Myeong et al. |
| 2009/0276277 A1 | 11/2009 | Vansteenkiste et al. |
| 2009/0313038 A1 | 12/2009 | Machtelinck |
| 2010/0057286 A1 | 3/2010 | Kerchner |
| 2010/0063652 A1 | 3/2010 | Anderson |
| 2010/0066587 A1 | 3/2010 | Yamauchi et al. |
| 2010/0299016 A1 | 11/2010 | Benzler et al. |
| 2011/0046784 A1 | 2/2011 | Anderson |
| 2011/0046836 A1 | 2/2011 | Anderson |
| 2011/0112713 A1 | 5/2011 | Teng et al. |
| 2011/0153172 A1 | 6/2011 | Anderson |
| 2011/0153338 A1 | 6/2011 | Anderson |
| 2011/0202307 A1 | 8/2011 | Petereit et al. |
| 2011/0208357 A1 | 8/2011 | Yamauchi |
| 2011/0295423 A1 | 12/2011 | Anderson |
| 2012/0012635 A1 | 1/2012 | Jaffe et al. |
| 2012/0029752 A1 | 2/2012 | Johnson et al. |
| 2012/0101679 A1 | 4/2012 | Anderson et al. |
| 2012/0143429 A1 | 6/2012 | Anderson |
| 2012/0215380 A1 | 8/2012 | Fouillade et al. |
| 2012/0226381 A1 | 9/2012 | Abramson et al. |
| 2012/0253581 A1 | 10/2012 | Anderson |
| 2012/0265346 A1 | 10/2012 | Gilbert, Jr. et al. |
| 2012/0303160 A1 | 11/2012 | Ziegler et al. |
| 2013/0000677 A1 | 1/2013 | Sumonthee |
| 2013/0031787 A1 | 2/2013 | Kamiya et al. |
| 2013/0031788 A1 | 2/2013 | Ohno |
| 2013/0098402 A1 | 4/2013 | Yoon et al. |
| 2013/0167495 A1 | 7/2013 | Borinato |
| 2013/0214498 A1 | 8/2013 | Defazio et al. |
| 2014/0000231 A1 | 1/2014 | Bernini |
| 2014/0126952 A1 | 5/2014 | Fay, II |
| 2014/0163733 A1 | 6/2014 | Sadowski et al. |
| 2014/0197222 A1 | 7/2014 | Howe |
| 2014/0203776 A1 | 7/2014 | Ireland et al. |
| 2014/0204510 A1 | 7/2014 | Ireland |
| 2014/0330496 A1 | 11/2014 | Crouse et al. |
| 2015/0012164 A1 | 1/2015 | Yu et al. |
| 2015/0045992 A1 | 2/2015 | Ashby et al. |
| 2015/0120057 A1 | 4/2015 | Wong et al. |
| 2015/0128547 A1 | 5/2015 | Einecke et al. |
| 2015/0163993 A1 | 6/2015 | Pettersson |
| 2015/0181806 A1 | 7/2015 | Lim et al. |
| 2015/0270729 A1 | 9/2015 | Isobe |
| 2015/0301532 A1 | 10/2015 | Norris et al. |
| 2015/0379785 A1 | 12/2015 | Brown, Jr. et al. |
| 2016/0014957 A1 | 1/2016 | Johansson et al. |
| 2016/0075032 A1 | 3/2016 | Goel et al. |
| 2016/0100523 A1 | 4/2016 | Anderson |
| 2016/0128275 A1 | 5/2016 | Johnson |
| 2016/0146611 A1 | 5/2016 | Matthews |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0311076 A1 | 10/2016 | Matsumoto et al. |

(56)                 References Cited

U.S. PATENT DOCUMENTS

| | | |
|---|---|---|
| 2016/0316619 A1 | 11/2016 | Johanek et al. |
| 2016/0338262 A1 | 11/2016 | Liu et al. |
| 2016/0354931 A1 | 12/2016 | Jones et al. |
| 2016/0360695 A1 | 12/2016 | Klackensjö |
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0269595 A1 | 9/2017 | Chen |
| 2017/0303466 A1 | 10/2017 | Grufman et al. |
| 2017/0308092 A1 | 10/2017 | Altinger et al. |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0263182 A1 | 9/2018 | Albinger et al. |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0227574 A1 | 7/2019 | Du et al. |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0265724 A1 | 8/2019 | Sheng et al. |
| 2019/0270124 A1 | 9/2019 | Jang et al. |
| 2019/0275666 A1 | 9/2019 | Abramson |
| 2019/0278269 A1 | 9/2019 | He et al. |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0339719 A1 | 11/2019 | Wang et al. |
| 2019/0343040 A1 | 11/2019 | Testolin et al. |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380266 A1 | 12/2019 | Liljedahl |
| 2019/0383887 A1 | 12/2019 | Kleiner et al. |
| 2019/0384306 A1 | 12/2019 | Jang et al. |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Ärlig et al. |
| 2020/0050208 A1 | 2/2020 | Frick et al. |
| 2020/0073403 A1 | 3/2020 | Abramson et al. |
| 2020/0093058 A1 | 3/2020 | Ritzer et al. |
| 2020/0100425 A1 | 4/2020 | Li |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0253116 A1 | 8/2020 | Ladd, Jr. et al. |
| 2020/0256369 A1 | 8/2020 | Gao |
| 2020/0260638 A1 | 8/2020 | Rotole |
| 2020/0267903 A1 | 8/2020 | Gao et al. |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0315087 A1 | 10/2020 | Svensson et al. |
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0041871 A1 | 2/2021 | Lai et al. |
| 2021/0048831 A1 | 2/2021 | Yun et al. |
| 2021/0059112 A1 | 3/2021 | Kim |
| 2021/0064036 A1 | 3/2021 | Muro et al. |
| 2021/0064050 A1 | 3/2021 | Pickett et al. |
| 2021/0070356 A1 | 3/2021 | Lyzen et al. |
| 2021/0072764 A1 | 3/2021 | Kean |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0089034 A1 | 3/2021 | Hjelmaker |
| 2021/0092912 A1 | 4/2021 | Wykman et al. |

(56) References Cited

U.S. PATENT DOCUMENTS

| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |
| 2021/0114810 A1 | 4/2021 | Matsuoka et al. |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0153428 A1 | 5/2021 | Mittmann et al. |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0176915 A1 | 6/2021 | Vines et al. |
| 2021/0179137 A1 | 6/2021 | Gillett |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | Vankampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0124973 A1 | 4/2022 | Juel |
| 2022/0129000 A1 | 4/2022 | Ingvalson et al. |
| 2022/0142438 A1 | 5/2022 | Chen et al. |
| 2022/0151143 A1 | 5/2022 | Liljedahl et al. |
| 2022/0151147 A1 | 5/2022 | Chen et al. |
| 2022/0167552 A1 | 6/2022 | Frick et al. |
| 2022/0167553 A1 | 6/2022 | Rogöet al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |

FOREIGN PATENT DOCUMENTS

| AU | 2011239328 A1 | 11/2011 |
| AU | 2012101338 A4 | 11/2012 |
| AU | 2014201952 A1 | 4/2014 |
| AU | 2015230722 A1 | 10/2015 |
| CA | 1079076 A | 6/1980 |
| CN | 2382585 Y | 6/2000 |
| CN | 2693167 Y | 4/2005 |
| CN | 3512456 | 3/2006 |
| CN | 3599999 | 1/2007 |
| CN | 3626101 | 3/2007 |
| CN | 101185088 A | 5/2008 |
| CN | 300775531 | 5/2008 |
| CN | 201127182 Y | 10/2008 |
| CN | 101313319 A | 11/2008 |
| CN | 201226676 Y | 4/2009 |
| CN | 201226677 Y | 4/2009 |
| CN | 100485567 C | 5/2009 |

(56)         References Cited

FOREIGN PATENT DOCUMENTS

| | | | |
|---|---|---|---|
| CN | 100498602 | C | 6/2009 |
| CN | 201260303 | Y | 6/2009 |
| CN | 301144405 | | 2/2010 |
| CN | 301276003 | | 6/2010 |
| CN | 301290512 | | 7/2010 |
| CN | 201557392 | U | 8/2010 |
| CN | 301328063 | | 8/2010 |
| CN | 101292244 | B | 12/2010 |
| CN | 301444971 | | 1/2011 |
| CN | 101982037 | A | 3/2011 |
| CN | 201797741 | U | 4/2011 |
| CN | 301506267 | | 4/2011 |
| CN | 201846616 | U | 6/2011 |
| CN | 301573109 | | 6/2011 |
| CN | 301611305 | | 7/2011 |
| CN | 301653707 | | 8/2011 |
| CN | 301660006 | | 8/2011 |
| CN | 301742022 | | 11/2011 |
| CN | 202077380 | U | 12/2011 |
| CN | 102523841 | A | 7/2012 |
| CN | 302020661 | | 8/2012 |
| CN | 102687620 | A | 9/2012 |
| CN | 102687625 | A | 9/2012 |
| CN | 302080704 | | 9/2012 |
| CN | 102771246 | A | 11/2012 |
| CN | 102771259 | A | 11/2012 |
| CN | 302218376 | | 12/2012 |
| CN | 102880175 | A | 1/2013 |
| CN | 302299693 | | 1/2013 |
| CN | 302350176 | | 3/2013 |
| CN | 302456271 | | 6/2013 |
| CN | 302483861 | | 6/2013 |
| CN | 103294056 | A | 9/2013 |
| CN | 103324191 | A | 9/2013 |
| CN | 103324192 | A | 9/2013 |
| CN | 203233683 | U | 10/2013 |
| CN | 302629702 | | 11/2013 |
| CN | 103473497 | A | 12/2013 |
| CN | 302702748 | | 1/2014 |
| CN | 103578164 | A | 2/2014 |
| CN | 103676947 | A | 3/2014 |
| CN | 203575087 | U | 5/2014 |
| CN | 103858584 | A | 6/2014 |
| CN | 203691948 | U | 7/2014 |
| CN | 203735069 | U | 7/2014 |
| CN | 302881351 | | 7/2014 |
| CN | 104007765 | A | 8/2014 |
| CN | 104025796 | A | 9/2014 |
| CN | 203840762 | U | 9/2014 |
| CN | 302943247 | | 9/2014 |
| CN | 302943249 | | 9/2014 |
| CN | 104094727 | A | 10/2014 |
| CN | 104111460 | A | 10/2014 |
| CN | 104111651 | A | 10/2014 |
| CN | 104111652 | A | 10/2014 |
| CN | 104111653 | A | 10/2014 |
| CN | 203851480 | U | 10/2014 |
| CN | 302974154 | | 10/2014 |
| CN | 104160830 | A | 11/2014 |
| CN | 302993652 | | 11/2014 |
| CN | 204014494 | U | 12/2014 |
| CN | 204047176 | U | 12/2014 |
| CN | 303058887 | | 12/2014 |
| CN | 204088427 | U | 1/2015 |
| CN | 303075143 | | 1/2015 |
| CN | 104360684 | A | 2/2015 |
| CN | 204143255 | U | 2/2015 |
| CN | 104571102 | A | 4/2015 |
| CN | 104686050 | A | 6/2015 |
| CN | 104704979 | A | 6/2015 |
| CN | 104704980 | A | 6/2015 |
| CN | 204362599 | U | 6/2015 |
| CN | 303232131 | | 6/2015 |
| CN | 104737699 | A | 7/2015 |
| CN | 104750104 | A | 7/2015 |
| CN | 104782314 | A | 7/2015 |
| CN | 104793614 | A | 7/2015 |
| CN | 104793617 | A | 7/2015 |
| CN | 204443108 | U | 7/2015 |
| CN | 204462853 | U | 7/2015 |
| CN | 204495362 | U | 7/2015 |
| CN | 204515530 | U | 7/2015 |
| CN | 204539960 | U | 8/2015 |
| CN | 303318601 | | 8/2015 |
| CN | 104904403 | A | 9/2015 |
| CN | 104904404 | A | 9/2015 |
| CN | 204613789 | U | 9/2015 |
| CN | 204649212 | U | 9/2015 |
| CN | 303408640 | | 10/2015 |
| CN | 105082080 | A | 11/2015 |
| CN | 105096177 | A | 11/2015 |
| CN | 303452341 | | 11/2015 |
| CN | 303452355 | | 11/2015 |
| CN | 105163037 | A | 12/2015 |
| CN | 204810982 | U | 12/2015 |
| CN | 204858702 | U | 12/2015 |
| CN | 204925588 | U | 12/2015 |
| CN | 303478376 | | 12/2015 |
| CN | 303519781 | | 12/2015 |
| CN | 105230225 | A | 1/2016 |
| CN | 103621244 | B | 2/2016 |
| CN | 105353758 | A | 2/2016 |
| CN | 303579400 | | 2/2016 |
| CN | 105432212 | A | 3/2016 |
| CN | 105512689 | A | 4/2016 |
| CN | 303654613 | | 4/2016 |
| CN | 105557175 | A | 5/2016 |
| CN | 105573308 | A | 5/2016 |
| CN | 105573311 | A | 5/2016 |
| CN | 303670522 | | 5/2016 |
| CN | 105660039 | A | 6/2016 |
| CN | 105684630 | A | 6/2016 |
| CN | 105700521 | A | 6/2016 |
| CN | 205335882 | U | 6/2016 |
| CN | 205336853 | U | 6/2016 |
| CN | 303690781 | | 6/2016 |
| CN | 105759813 | A | 7/2016 |
| CN | 205431101 | U | 8/2016 |
| CN | 205489586 | U | 8/2016 |
| CN | 303778782 | | 8/2016 |
| CN | 303862286 | | 9/2016 |
| CN | 103283404 | B | 10/2016 |
| CN | 105988469 | A | 10/2016 |
| CN | 105988470 | A | 10/2016 |
| CN | 106020207 | A | 10/2016 |
| CN | 303888354 | | 10/2016 |
| CN | 303888360 | | 10/2016 |
| CN | 106142023 | A | 11/2016 |
| CN | 205694315 | U | 11/2016 |
| CN | 303933081 | | 11/2016 |
| CN | 103941600 | B | 12/2016 |
| CN | 106171248 | A | 12/2016 |
| CN | 205812811 | U | 12/2016 |
| CN | 205829192 | U | 12/2016 |
| CN | 205830138 | U | 12/2016 |
| CN | 303969591 | | 12/2016 |
| CN | 106258166 | A | 1/2017 |
| CN | 106325280 | A | 1/2017 |
| CN | 106355609 | A | 1/2017 |
| CN | 304004639 | | 1/2017 |
| CN | 106393094 | A | 2/2017 |
| CN | 106406301 | A | 2/2017 |
| CN | 304055132 | | 2/2017 |
| CN | 304055134 | | 2/2017 |
| CN | 304055136 | | 2/2017 |
| CN | 106489412 | A | 3/2017 |
| CN | 205993268 | U | 3/2017 |
| CN | 103576681 | B | 4/2017 |
| CN | 206115269 | U | 4/2017 |
| CN | 304095129 | | 4/2017 |
| CN | 106647727 | A | 5/2017 |
| CN | 106708033 | A | 5/2017 |
| CN | 206196372 | U | 5/2017 |
| CN | 304129527 | | 5/2017 |

(56) References Cited

FOREIGN PATENT DOCUMENTS

| | | | |
|---|---|---|---|
| CN | 304129534 | | 5/2017 |
| CN | 106852225 | A | 6/2017 |
| CN | 106877420 | A | 6/2017 |
| CN | 206274765 | U | 6/2017 |
| CN | 206278169 | U | 6/2017 |
| CN | 304175254 | | 6/2017 |
| CN | 304208974 | | 7/2017 |
| CN | 107024910 | A | 8/2017 |
| CN | 304227934 | | 8/2017 |
| CN | 304241160 | | 8/2017 |
| CN | 206472500 | U | 9/2017 |
| CN | 304283754 | | 9/2017 |
| CN | 206547328 | U | 10/2017 |
| CN | 206547363 | U | 10/2017 |
| CN | 206611777 | U | 11/2017 |
| CN | 206611791 | U | 11/2017 |
| CN | 206611812 | U | 11/2017 |
| CN | 206619022 | U | 11/2017 |
| CN | 107463166 | A | 12/2017 |
| CN | 107463168 | A | 12/2017 |
| CN | 107505939 | A | 12/2017 |
| CN | 107515603 | A | 12/2017 |
| CN | 107516226 | A | 12/2017 |
| CN | 107517642 | A | 12/2017 |
| CN | 206686605 | U | 12/2017 |
| CN | 206808075 | U | 12/2017 |
| CN | 107544483 | A | 1/2018 |
| CN | 107600209 | A | 1/2018 |
| CN | 107624368 | A | 1/2018 |
| CN | 207037461 | U | 2/2018 |
| CN | 107800200 | A | 3/2018 |
| CN | 207075257 | U | 3/2018 |
| CN | 304529661 | | 3/2018 |
| CN | 304544247 | | 3/2018 |
| CN | 107888751 | A | 4/2018 |
| CN | 107913034 | A | 4/2018 |
| CN | 107960191 | A | 4/2018 |
| CN | 207201326 | U | 4/2018 |
| CN | 304565875 | | 4/2018 |
| CN | 108055906 | A | 5/2018 |
| CN | 108064539 | A | 5/2018 |
| CN | 108073179 | A | 5/2018 |
| CN | 108156957 | A | 6/2018 |
| CN | 108205313 | A | 6/2018 |
| CN | 207496811 | U | 6/2018 |
| CN | 108323326 | A | 7/2018 |
| CN | 108337987 | A | 7/2018 |
| CN | 108345297 | A | 7/2018 |
| CN | 108345298 | A | 7/2018 |
| CN | 207639110 | U | 7/2018 |
| CN | 207651536 | U | 7/2018 |
| CN | 207692389 | U | 8/2018 |
| CN | 304767946 | | 8/2018 |
| CN | 304794944 | | 8/2018 |
| CN | 207851614 | U | 9/2018 |
| CN | 304806495 | | 9/2018 |
| CN | 304811825 | | 9/2018 |
| CN | 108664014 | A | 10/2018 |
| CN | 108693873 | A | 10/2018 |
| CN | 207965652 | U | 10/2018 |
| CN | 108919814 | A | 11/2018 |
| CN | 208159284 | U | 11/2018 |
| CN | 108957512 | A | 12/2018 |
| CN | 109062225 | A | 12/2018 |
| CN | 109075284 | A | 12/2018 |
| CN | 208175354 | U | 12/2018 |
| CN | 208285831 | U | 12/2018 |
| CN | 304926953 | | 12/2018 |
| CN | 304926955 | | 12/2018 |
| CN | 109213123 | A | 1/2019 |
| CN | 208387297 | U | 1/2019 |
| CN | 304980236 | | 1/2019 |
| CN | 305010344 | | 1/2019 |
| CN | 305010365 | | 1/2019 |
| CN | 305017366 | | 1/2019 |
| CN | 105875063 | B | 2/2019 |
| CN | 208480301 | U | 2/2019 |
| CN | 208521989 | U | 2/2019 |
| CN | 305027640 | | 2/2019 |
| CN | 109542092 | A | 3/2019 |
| CN | 208638993 | U | 3/2019 |
| CN | 109566065 | A | 4/2019 |
| CN | 109601114 | A | 4/2019 |
| CN | 109658937 | A | 4/2019 |
| CN | 109682368 | A | 4/2019 |
| CN | 109682371 | A | 4/2019 |
| CN | 109683604 | A | 4/2019 |
| CN | 109696888 | A | 4/2019 |
| CN | 208739598 | U | 4/2019 |
| CN | 208752461 | U | 4/2019 |
| CN | 109757189 | A | 5/2019 |
| CN | 106982585 | B | 6/2019 |
| CN | 109892096 | A | 6/2019 |
| CN | 209002355 | U | 6/2019 |
| CN | 209002393 | U | 6/2019 |
| CN | 305196413 | | 6/2019 |
| CN | 305225230 | | 6/2019 |
| CN | 305227797 | | 6/2019 |
| CN | 305227798 | | 6/2019 |
| CN | 305227800 | | 6/2019 |
| CN | 305503785 | | 6/2019 |
| CN | 109960253 | A | 7/2019 |
| CN | 109962512 | A | 7/2019 |
| CN | 109983907 | A | 7/2019 |
| CN | 109983908 | A | 7/2019 |
| CN | 110018686 | A | 7/2019 |
| CN | 209170907 | U | 7/2019 |
| CN | 305261165 | | 7/2019 |
| CN | 305261166 | | 7/2019 |
| CN | 305265564 | | 7/2019 |
| CN | 209265268 | U | 8/2019 |
| CN | 209299766 | U | 8/2019 |
| CN | 106155056 | B | 9/2019 |
| CN | 110221594 | A | 9/2019 |
| CN | 110268858 | A | 9/2019 |
| CN | 209409782 | U | 9/2019 |
| CN | 305355791 | | 9/2019 |
| CN | 305357008 | | 9/2019 |
| CN | 110347144 | A | 10/2019 |
| CN | 110366368 | A | 10/2019 |
| CN | 305407445 | | 10/2019 |
| CN | 110447372 | A | 11/2019 |
| CN | 209676901 | U | 11/2019 |
| CN | 305447400 | | 11/2019 |
| CN | 305452583 | | 11/2019 |
| CN | 110584551 | A | 12/2019 |
| CN | 110622680 | A | 12/2019 |
| CN | 209861609 | U | 12/2019 |
| CN | 305523640 | | 12/2019 |
| CN | 209955654 | U | 1/2020 |
| CN | 209964645 | U | 1/2020 |
| CN | 305574602 | | 1/2020 |
| CN | 110764495 | A | 2/2020 |
| CN | 110850858 | A | 2/2020 |
| CN | 110850860 | A | 2/2020 |
| CN | 110852133 | A | 2/2020 |
| CN | 210016305 | U | 2/2020 |
| CN | 210116329 | U | 2/2020 |
| CN | 305596393 | | 2/2020 |
| CN | 105988472 | B | 3/2020 |
| CN | 107493797 | B | 3/2020 |
| CN | 110881903 | A | 3/2020 |
| CN | 110895411 | A | 3/2020 |
| CN | 110915409 | A | 3/2020 |
| CN | 110928280 | A | 3/2020 |
| CN | 110928285 | A | 3/2020 |
| CN | 107643751 | B | 4/2020 |
| CN | 111034450 | A | 4/2020 |
| CN | 111045423 | A | 4/2020 |
| CN | 305716236 | | 4/2020 |
| CN | 107643750 | B | 5/2020 |
| CN | 108142070 | B | 5/2020 |
| CN | 111123910 | A | 5/2020 |
| CN | 111165158 | A | 5/2020 |

(56)            References Cited

FOREIGN PATENT DOCUMENTS

| | | | |
|---|---|---|---|
| CN | 210444878 | U | 5/2020 |
| CN | 210580043 | U | 5/2020 |
| CN | 305750432 | | 5/2020 |
| CN | 305757781 | | 5/2020 |
| CN | 305789888 | | 5/2020 |
| CN | 111226569 | A | 6/2020 |
| CN | 210782124 | U | 6/2020 |
| CN | 210808273 | U | 6/2020 |
| CN | 210821640 | U | 6/2020 |
| CN | 210839520 | U | 6/2020 |
| CN | 305827495 | | 6/2020 |
| CN | 305827496 | | 6/2020 |
| CN | 305827503 | | 6/2020 |
| CN | 305860595 | | 6/2020 |
| CN | 305860598 | | 6/2020 |
| CN | 305869411 | | 6/2020 |
| CN | 106717462 | B | 7/2020 |
| CN | 108811699 | B | 7/2020 |
| CN | 210900401 | U | 7/2020 |
| CN | 210987056 | U | 7/2020 |
| CN | 211015146 | U | 7/2020 |
| CN | 305946746 | | 7/2020 |
| CN | 305946760 | | 7/2020 |
| CN | 111487982 | A | 8/2020 |
| CN | 111512766 | A | 8/2020 |
| CN | 211212948 | U | 8/2020 |
| CN | 305989577 | | 8/2020 |
| CN | 306019404 | | 8/2020 |
| CN | 105988471 | B | 9/2020 |
| CN | 111685651 | A | 9/2020 |
| CN | 211531846 | U | 9/2020 |
| CN | 211580673 | U | 9/2020 |
| CN | 107637255 | B | 10/2020 |
| CN | 110754204 | B | 10/2020 |
| CN | 111742692 | A | 10/2020 |
| CN | 111766589 | A | 10/2020 |
| CN | 111819988 | A | 10/2020 |
| CN | 211721118 | U | 10/2020 |
| CN | 211721119 | U | 10/2020 |
| CN | 211741921 | U | 10/2020 |
| CN | 211741924 | U | 10/2020 |
| CN | 306085189 | | 10/2020 |
| CN | 306128197 | | 10/2020 |
| CN | 306140210 | | 10/2020 |
| CN | 306174630 | | 11/2020 |
| CN | 112009175 | A | 12/2020 |
| CN | 112119742 | A | 12/2020 |
| CN | 112120620 | A | 12/2020 |
| CN | 112134314 | A | 12/2020 |
| CN | 112147992 | A | 12/2020 |
| CN | 212061111 | U | 12/2020 |
| CN | 212116218 | U | 12/2020 |
| CN | 212116223 | U | 12/2020 |
| CN | 306223128 | | 12/2020 |
| CN | 306236075 | | 12/2020 |
| CN | 306236808 | | 12/2020 |
| CN | 112230636 | A | 1/2021 |
| CN | 112230637 | A | 1/2021 |
| CN | 112230644 | A | 1/2021 |
| CN | 112235760 | A | 1/2021 |
| CN | 112259866 | A | 1/2021 |
| CN | 112261631 | A | 1/2021 |
| CN | 212303785 | U | 1/2021 |
| CN | 212304892 | U | 1/2021 |
| CN | 212305863 | U | 1/2021 |
| CN | 306278588 | | 1/2021 |
| CN | 306303188 | | 1/2021 |
| CN | 106909140 | B | 2/2021 |
| CN | 109247117 | B | 2/2021 |
| CN | 109683556 | B | 2/2021 |
| CN | 112306049 | A | 2/2021 |
| CN | 112385401 | A | 2/2021 |
| CN | 112400453 | A | 2/2021 |
| CN | 212499740 | U | 2/2021 |
| CN | 212515710 | U | 2/2021 |
| CN | 212520009 | U | 2/2021 |
| CN | 212539202 | U | 2/2021 |
| CN | 212572469 | U | 2/2021 |
| CN | 212621511 | U | 2/2021 |
| CN | 306328112 | | 2/2021 |
| CN | 112435422 | A | 3/2021 |
| CN | 112438114 | A | 3/2021 |
| CN | 112445221 | A | 3/2021 |
| CN | 112449864 | A | 3/2021 |
| CN | 112492956 | A | 3/2021 |
| CN | 112514637 | A | 3/2021 |
| CN | 112567959 | A | 3/2021 |
| CN | 112567961 | A | 3/2021 |
| CN | 212696648 | U | 3/2021 |
| CN | 212696668 | U | 3/2021 |
| CN | 306358736 | | 3/2021 |
| CN | 112602441 | A | 4/2021 |
| CN | 112720451 | A | 4/2021 |
| CN | 112731935 | A | 4/2021 |
| CN | 212876733 | U | 4/2021 |
| CN | 212906002 | U | 4/2021 |
| CN | 212933333 | U | 4/2021 |
| CN | 212970834 | U | 4/2021 |
| CN | 213075541 | U | 4/2021 |
| CN | 213091901 | U | 4/2021 |
| CN | 112740889 | A | 5/2021 |
| CN | 112764419 | A | 5/2021 |
| CN | 112769424 | A | 5/2021 |
| CN | 112773264 | A | 5/2021 |
| CN | 112799395 | A | 5/2021 |
| CN | 112799399 | A | 5/2021 |
| CN | 112823584 | A | 5/2021 |
| CN | 112824993 | A | 5/2021 |
| CN | 112826376 | A | 5/2021 |
| CN | 112840828 | A | 5/2021 |
| CN | 112859828 | A | 5/2021 |
| CN | 213187216 | U | 5/2021 |
| CN | 213210764 | U | 5/2021 |
| CN | 213214364 | U | 5/2021 |
| CN | 213240579 | U | 5/2021 |
| CN | 306511371 | | 5/2021 |
| CN | 306530808 | | 5/2021 |
| CN | 306569554 | | 5/2021 |
| CN | 306569555 | | 5/2021 |
| CN | 306569560 | | 5/2021 |
| CN | 107976995 | B | 6/2021 |
| CN | 110122045 | B | 6/2021 |
| CN | 112947399 | A | 6/2021 |
| CN | 112970414 | A | 6/2021 |
| CN | 113039919 | A | 6/2021 |
| CN | 213306269 | U | 6/2021 |
| CN | 306604261 | | 6/2021 |
| CN | 113064419 | A | 7/2021 |
| CN | 113156928 | A | 7/2021 |
| CN | 113156929 | A | 7/2021 |
| CN | 213814000 | U | 7/2021 |
| CN | 306670241 | | 7/2021 |
| CN | 306680105 | | 7/2021 |
| CN | 306694791 | | 7/2021 |
| CN | 106300578 | B | 8/2021 |
| CN | 108781704 | B | 8/2021 |
| CN | 113311830 | A | 8/2021 |
| CN | 213850492 | U | 8/2021 |
| CN | 213921292 | U | 8/2021 |
| CN | 306745285 | | 8/2021 |
| CN | 306753239 | | 8/2021 |
| CN | 306768440 | | 8/2021 |
| CN | 113366964 | A | 9/2021 |
| CN | 113439526 | A | 9/2021 |
| CN | 113448259 | A | 9/2021 |
| CN | 214126036 | U | 9/2021 |
| CN | 214151499 | U | 9/2021 |
| CN | 214178073 | U | 9/2021 |
| CN | 214240309 | U | 9/2021 |
| CN | 306824139 | | 9/2021 |
| CN | 306839148 | | 9/2021 |
| CN | 306846782 | | 9/2021 |
| CN | 113455167 | A | 10/2021 |
| CN | 113552873 | A | 10/2021 |

(56) References Cited

FOREIGN PATENT DOCUMENTS

| | | | |
|---|---|---|---|
| CN | 113552874 A | 10/2021 |
| CN | 214508006 U | 10/2021 |
| CN | 306880401 | 10/2021 |
| CN | 113721749 A | 11/2021 |
| CN | 214852822 U | 11/2021 |
| CN | 113759377 A | 12/2021 |
| CN | 113759886 A | 12/2021 |
| CN | 113771556 A | 12/2021 |
| CN | 113778084 A | 12/2021 |
| CN | 113805573 A | 12/2021 |
| CN | 113812251 A | 12/2021 |
| CN | 215011658 U | 12/2021 |
| CN | 215041875 U | 12/2021 |
| CN | 215073955 U | 12/2021 |
| CN | 215122126 U | 12/2021 |
| CN | 215223139 U | 12/2021 |
| CN | 215223140 U | 12/2021 |
| CN | 215244172 U | 12/2021 |
| CN | 215269503 U | 12/2021 |
| CN | 215321765 U | 12/2021 |
| CN | 307001745 | 12/2021 |
| CN | 307035324 | 12/2021 |
| CN | 113892332 A | 1/2022 |
| CN | 113970918 A | 1/2022 |
| CN | 307047963 | 1/2022 |
| CN | 307047966 | 1/2022 |
| CN | 114089423 A | 2/2022 |
| CN | 215774282 U | 2/2022 |
| CN | 215813854 U | 2/2022 |
| CN | 215911524 U | 2/2022 |
| CN | 307125064 | 2/2022 |
| CN | 114097400 A | 3/2022 |
| CN | 216058306 U | 3/2022 |
| CN | 307168522 | 3/2022 |
| CN | 307168531 | 3/2022 |
| CN | 307168534 | 3/2022 |
| CN | 307168536 | 3/2022 |
| CN | 307202311 | 3/2022 |
| CN | 216153511 U | 4/2022 |
| CN | 216253986 U | 4/2022 |
| CN | 307222105 | 4/2022 |
| CN | 307243485 | 4/2022 |
| CN | 307265564 | 4/2022 |
| CN | 307265565 | 4/2022 |
| CN | 307278021 | 4/2022 |
| CN | 307278029 | 4/2022 |
| CN | 307301254 | 4/2022 |
| CN | 216507708 U | 5/2022 |
| CN | 216610752 U | 5/2022 |
| CN | 307325242 | 5/2022 |
| CN | 307337031 | 5/2022 |
| CN | 307347754 | 5/2022 |
| CN | 307347757 | 5/2022 |
| CN | 307369096 | 5/2022 |
| CN | 307369129 | 5/2022 |
| CN | 307376792 | 5/2022 |
| CN | 115666221 A | 1/2023 |
| DE | 7345220 U | 6/1974 |
| DE | 7345211 U | 11/1974 |
| DE | 2437756 A1 | 3/1975 |
| DE | 2448130 A1 | 4/1976 |
| DE | 7609000 U1 | 9/1977 |
| DE | 2612381 A1 | 10/1977 |
| DE | 19521067 A1 | 12/1996 |
| DE | 19644057 A1 | 5/1998 |
| DE | 29823263 U1 | 4/1999 |
| DE | 19933340 A1 | 1/2001 |
| DE | 20308046 U1 | 7/2003 |
| DE | 10302908 A1 | 8/2004 |
| DE | 102006038553 A1 | 2/2008 |
| DE | 102007053310 A1 | 6/2009 |
| DE | 102007060056 A1 | 6/2009 |
| DE | 102008011947 A1 | 9/2009 |
| DE | 202010007832 U1 | 8/2010 |
| DE | 402010004757-0001 | 12/2010 |
| DE | 102009027557 A1 | 1/2011 |
| DE | 202012011298 U1 | 1/2013 |
| DE | 202012009375 U1 | 4/2013 |
| DE | 102013202075 A1 | 8/2014 |
| DE | 102013203549 A1 | 9/2014 |
| DE | 102013203705 A1 | 9/2014 |
| DE | 202014005547 U1 | 9/2014 |
| DE | 202014102390 U1 | 9/2014 |
| DE | 102014211712 A1 | 2/2015 |
| DE | 102014112587 A1 | 3/2015 |
| DE | 102014208434 A1 | 11/2015 |
| DE | 102014210277 A1 | 12/2015 |
| DE | 102014212399 A1 | 12/2015 |
| DE | 102016205336 A1 | 10/2017 |
| DE | 102016219270 A1 | 4/2018 |
| DE | 102016222659 A1 | 5/2018 |
| DE | 202018100833 U1 | 5/2018 |
| DE | 202018100835 U1 | 5/2018 |
| DE | 202018100836 U1 | 5/2018 |
| DE | 102017204865 A1 | 9/2018 |
| DE | 102018206803 A1 | 11/2019 |
| DE | 202015009764 U1 | 1/2020 |
| DE | 102019206856 A1 | 11/2020 |
| DE | 102019214995 A1 | 4/2021 |
| DE | 102019215913 A1 | 4/2021 |
| DE | 202021101493 U1 * | 4/2021 | .......... H01M 50/691 |
| DE | 102021100122 A1 | 7/2021 |
| DE | 102020202740 A1 | 9/2021 |
| EP | 1364571 A2 | 11/2003 |
| EP | 1709859 A1 | 10/2006 |
| EP | 2006708 A1 | 12/2008 |
| EP | 2026161 A1 | 2/2009 |
| EP | 2163352 A2 | 3/2010 |
| EP | 2248409 A1 | 11/2010 |
| EP | 2269433 A1 | 1/2011 |
| EP | 2286653 A2 | 2/2011 |
| EP | 2296072 A2 | 3/2011 |
| EP | 2425700 A2 | 3/2012 |
| EP | 2534937 A1 | 12/2012 |
| EP | 2586283 A1 | 5/2013 |
| EP | 2687077 A2 | 1/2014 |
| EP | 2693072 A1 | 2/2014 |
| EP | 2798937 A1 | 11/2014 |
| EP | 2823936 A2 | 1/2015 |
| EP | 2851760 A1 | 3/2015 |
| EP | 2875712 A1 | 5/2015 |
| EP | 2717110 B1 | 8/2015 |
| EP | 2959764 A1 | 12/2015 |
| EP | 2960741 A2 | 12/2015 |
| EP | 2960742 A1 | 12/2015 |
| EP | 2783561 B1 | 3/2016 |
| EP | 2692220 B1 | 4/2016 |
| EP | 3047719 A1 | 7/2016 |
| EP | 3118016 A1 | 1/2017 |
| EP | 3165075 A1 | 5/2017 |
| EP | 3167699 A1 | 5/2017 |
| EP | 3167700 A1 | 5/2017 |
| EP | 3222132 A2 | 9/2017 |
| EP | 2883437 B1 | 3/2018 |
| EP | 3316067 A1 | 5/2018 |
| EP | 2743789 B1 | 6/2018 |
| EP | 3330824 A1 | 6/2018 |
| EP | 3366102 A1 | 8/2018 |
| EP | 3381258 A1 | 10/2018 |
| EP | 3479682 A1 | 5/2019 |
| EP | 2960100 B1 | 8/2019 |
| EP | 3520593 A1 | 8/2019 |
| EP | 3528213 A1 | 8/2019 |
| EP | 3534183 A1 | 9/2019 |
| EP | 3597090 A1 | 1/2020 |
| EP | 3660618 A1 | 6/2020 |
| EP | 3725146 A1 | 10/2020 |
| EP | 3753387 A1 | 12/2020 |
| EP | 3791708 A1 | 3/2021 |
| EP | 3831544 A1 | 6/2021 |
| EP | 3837944 A1 | 6/2021 |
| EP | 3837945 A1 | 6/2021 |
| EP | 3837946 A1 | 6/2021 |
| EP | 3861911 A2 | 8/2021 |

(56) References Cited

FOREIGN PATENT DOCUMENTS

| | | |
|---|---|---|
| ES | 199267 U | 7/1975 |
| ES | 451339 A1 | 12/1977 |
| FR | 2771141 A1 | 5/1999 |
| FR | 3114537 A1 | 4/2022 |
| GB | 1288108 A | 3/1971 |
| GB | 1371959 A | 10/1974 |
| GB | 1451896 A | 10/1976 |
| GB | 1452308 A | 10/1976 |
| GB | 1489373 A | 10/1977 |
| GB | 1526519 A | 9/1978 |
| GB | 1557379 A | 12/1979 |
| GB | 2287170 A | 9/1995 |
| GB | 2295304 A | 5/1996 |
| GB | 2305840 A | 4/1997 |
| GB | 2419430 A | 4/2006 |
| GB | 2432922 A | 6/2007 |
| GB | 2433791 A | 7/2007 |
| GB | 90017056580001 | 5/2010 |
| GB | 2500168 A | 9/2013 |
| GB | 90024715400001 | 8/2014 |
| GB | 2513960 A | 11/2014 |
| GB | 2515556 A | 12/2014 |
| GB | 2516370 A | 1/2015 |
| GB | 90027012680001 | 5/2015 |
| GB | 90027378900001 | 10/2015 |
| GB | 90041329260001 | 9/2017 |
| GB | 90029638920001 | 3/2018 |
| GB | 90056318840001 | 9/2018 |
| GB | 2563347 A | 12/2018 |
| GB | 90040756950001 | 6/2019 |
| GB | 90073918420006 | 1/2020 |
| GB | 90080413210001 | 8/2020 |
| GB | 2581956 A | 9/2020 |
| GB | 90081876860001 | 10/2020 |
| GB | 6195686 | 5/2022 |
| JP | 2006251883 A | 9/2006 |
| JP | 2006268497 A | 10/2006 |
| JP | 2011020615 A | 2/2011 |
| JP | 2013004228 A | 1/2013 |
| JP | 2015149963 A | 8/2015 |
| KR | 20130044130 A | 5/2013 |
| KR | 20150125305 A | 11/2015 |
| SE | 538774 C2 | 11/2016 |
| SE | 540834 C2 | 11/2018 |
| SE | 542098 C2 | 2/2020 |
| SE | 543019 C2 | 9/2020 |
| SE | 543247 C2 | 10/2020 |
| SE | 2150377 A1 | 3/2021 |
| SE | 1951390 A1 | 6/2021 |
| SE | 2150080 A1 | 6/2021 |
| SE | 2050216 A1 | 8/2021 |
| SE | 543941 C2 | 9/2021 |
| SE | 543943 C2 | 9/2021 |
| SE | 2150193 A1 | 10/2021 |
| SE | 2150394 A1 | 10/2021 |
| WO | WO9106435 A1 | 5/1991 |
| WO | WO9749528 A1 | 12/1997 |
| WO | WO0060921 A1 | 10/2000 |
| WO | WO0074466 A1 | 12/2000 |
| WO | WO03040846 A1 | 5/2003 |
| WO | WO03103375 A1 | 12/2003 |
| WO | WO2005002320 A1 | 1/2005 |
| WO | WO2006094887 A2 | 9/2006 |
| WO | WO2006094889 A1 | 9/2006 |
| WO | WO2006102740 A1 | 10/2006 |
| WO | WO2007091967 A1 | 8/2007 |
| WO | WO2007140930 A1 | 12/2007 |
| WO | WO2008015479 A2 | 2/2008 |
| WO | WO2008060689 A2 | 5/2008 |
| WO | WO2008068494 A1 | 6/2008 |
| WO | WO2008095715 A2 | 8/2008 |
| WO | WO2008144135 A1 | 11/2008 |
| WO | WO2009036644 A1 | 3/2009 |
| WO | WO2009071379 A1 | 6/2009 |
| WO | WO2009077239 A1 | 6/2009 |
| WO | WO2009083319 A1 | 7/2009 |
| WO | WO2010077198 A1 | 7/2010 |
| WO | WO2010130479 A2 | 11/2010 |
| WO | WO2011115536 A1 | 9/2011 |
| WO | WO2012047176 A1 | 4/2012 |
| WO | WO2013010475 A1 | 1/2013 |
| WO | WO2013011252 A1 | 1/2013 |
| WO | WO2013025135 A1 | 2/2013 |
| WO | WO2013064301 A1 | 5/2013 |
| WO | WO2013081516 A1 | 6/2013 |
| WO | WO2013083311 A1 | 6/2013 |
| WO | WO2013102417 A1 | 7/2013 |
| WO | WO2013107266 A1 | 7/2013 |
| WO | WO2013107374 A1 | 7/2013 |
| WO | WO2013125992 A1 | 8/2013 |
| WO | WO2013185622 A1 | 12/2013 |
| WO | WO2014007694 A1 | 1/2014 |
| WO | WO2014056443 A1 | 4/2014 |
| WO | WO2014071860 A1 | 5/2014 |
| WO | WO2014079363 A1 | 5/2014 |
| WO | WO2014079632 A1 | 5/2014 |
| WO | WO2014086267 A1 | 6/2014 |
| WO | WO2014173290 A1 | 10/2014 |
| WO | WO2015010277 A1 | 1/2015 |
| WO | WO2015053488 A1 | 4/2015 |
| WO | WO2015144998 A1 | 10/2015 |
| WO | WO2015154822 A1 | 10/2015 |
| WO | WO2015161829 A1 | 10/2015 |
| WO | WO2015169343 A1 | 11/2015 |
| WO | WO2015172831 A1 | 11/2015 |
| WO | WO2015182514 A1 | 12/2015 |
| WO | WO2015192903 A1 | 12/2015 |
| WO | WO2016038512 A1 | 3/2016 |
| WO | WO2016097891 A1 | 6/2016 |
| WO | WO2016097892 A1 | 6/2016 |
| WO | WO2016097897 A1 | 6/2016 |
| WO | WO2016103070 A1 | 6/2016 |
| WO | WO2016108104 A1 | 7/2016 |
| WO | WO2016109721 A1 | 7/2016 |
| WO | WO2016119751 A1 | 8/2016 |
| WO | WO2016127923 A1 | 8/2016 |
| WO | WO2016131399 A1 | 8/2016 |
| WO | WO2016184398 A1 | 11/2016 |
| WO | WO2017101882 A1 | 6/2017 |
| WO | WO2017123137 A1 | 7/2017 |
| WO | WO2017129551 A1 | 8/2017 |
| WO | WO2017133625 A1 | 8/2017 |
| WO | WO2017148438 A1 | 9/2017 |
| WO | WO2017167207 A1 | 10/2017 |
| WO | WO2017181995 A1 | 10/2017 |
| WO | WO2017186372 A1 | 11/2017 |
| WO | WO2017190784 A1 | 11/2017 |
| WO | WO2017198222 A1 | 11/2017 |
| WO | WO2017206950 A1 | 12/2017 |
| WO | WO2017211308 A1 | 12/2017 |
| WO | WO2018001340 A1 | 1/2018 |
| WO | WO2018010650 A1 | 1/2018 |
| WO | WO2018028624 A1 | 2/2018 |
| WO | WO2018057250 A1 | 3/2018 |
| WO | WO2018057452 A2 | 3/2018 |
| WO | WO2018057589 A1 | 3/2018 |
| WO | WO2018059323 A1 | 4/2018 |
| WO | WO2018103178 A1 | 6/2018 |
| WO | WO2018117190 A1 | 6/2018 |
| WO | WO2018125222 A1 | 7/2018 |
| WO | WO2018127209 A1 | 7/2018 |
| WO | WO2018146518 A1 | 8/2018 |
| WO | WO2018153599 A1 | 8/2018 |
| WO | WO2018174777 A1 | 9/2018 |
| WO | WO2018185376 A1 | 10/2018 |
| WO | WO2018199829 A1 | 11/2018 |
| WO | WO2019034382 A1 | 2/2019 |
| WO | WO2019063012 A1 | 4/2019 |
| WO | WO2019080935 A1 | 5/2019 |
| WO | WO2019096052 A1 | 5/2019 |
| WO | WO2019096463 A1 | 5/2019 |
| WO | WO2019109982 A1 | 6/2019 |
| WO | WO2019110013 A1 | 6/2019 |
| WO | WO2019144916 A1 | 8/2019 |

(56)  References Cited

FOREIGN PATENT DOCUMENTS

| | | |
|---|---|---|
| WO | WO2019157841 A1 | 8/2019 |
| WO | WO2019158090 A1 | 8/2019 |
| WO | WO2019158452 A1 | 8/2019 |
| WO | WO2019168069 A1 | 9/2019 |
| WO | WO2019170142 A1 | 9/2019 |
| WO | WO2019206274 A1 | 10/2019 |
| WO | WO2019238099 A1 | 12/2019 |
| WO | WO2020020652 A1 | 1/2020 |
| WO | WO2020063811 A1 | 4/2020 |
| WO | WO2020064087 A1 | 4/2020 |
| WO | WO2020093970 A1 | 5/2020 |
| WO | WO2020093992 A1 | 5/2020 |
| WO | WO2020098666 A1 | 5/2020 |
| WO | WO2020098670 A1 | 5/2020 |
| WO | WO2020103696 A1 | 5/2020 |
| WO | WO2020104242 A1 | 5/2020 |
| WO | WO2020107007 A1 | 5/2020 |
| WO | WO2020107772 A1 | 6/2020 |
| WO | WO2020108267 A1 | 6/2020 |
| WO | WO2020108550 A1 | 6/2020 |
| WO | WO2020114415 A1 | 6/2020 |
| WO | WO2020125450 A1 | 6/2020 |
| WO | WO2020134667 A1 | 7/2020 |
| WO | WO2020148138 A1 | 7/2020 |
| WO | WO2020155853 A1 | 8/2020 |
| WO | WO2020156519 A1 | 8/2020 |
| WO | WO2020156684 A1 | 8/2020 |
| WO | WO2020156851 A1 | 8/2020 |
| WO | WO2020161021 A1 | 8/2020 |
| WO | WO2020170933 A1 | 8/2020 |
| WO | WO2020193513 A1 | 10/2020 |
| WO | WO2020199055 A1 | 10/2020 |
| WO | WO2020218960 A1 | 10/2020 |
| WO | WO2020256619 A1 | 12/2020 |
| WO | WO2020259586 A1 | 12/2020 |
| WO | WODM212022 | 12/2020 |
| WO | WO2021013173 A1 | 1/2021 |
| WO | WO2021023227 A1 | 2/2021 |
| WO | WO2021031418 A1 | 2/2021 |
| WO | WO2021031423 A1 | 2/2021 |
| WO | WO2021031451 A1 | 2/2021 |
| WO | WO2021036033 A1 | 3/2021 |
| WO | WO2021036077 A1 | 3/2021 |
| WO | WO2021047063 A1 | 3/2021 |
| WO | WO2021047068 A1 | 3/2021 |
| WO | WO2021047602 A1 | 3/2021 |
| WO | WO2021068370 A1 | 4/2021 |
| WO | WO2021068928 A1 | 4/2021 |
| WO | WO2021078220 A1 | 4/2021 |
| WO | WO2021082817 A1 | 5/2021 |
| WO | WO2021088551 A1 | 5/2021 |
| WO | WO2021088553 A1 | 5/2021 |
| WO | WO2021088558 A1 | 5/2021 |
| WO | WO2021093474 A1 | 5/2021 |
| WO | WO2021093526 A1 | 5/2021 |
| WO | WO2021093851 A1 | 5/2021 |
| WO | WO2021098382 A1 | 5/2021 |
| WO | WO2021103803 A1 | 6/2021 |
| WO | WO2021103804 A1 | 6/2021 |
| WO | WO2021110414 A1 | 6/2021 |
| WO | WO2021114988 A1 | 6/2021 |
| WO | WO2021115364 A1 | 6/2021 |
| WO | WO2021136234 A1 | 7/2021 |
| WO | WO2021139389 A1 | 7/2021 |
| WO | WO2021139683 A1 | 7/2021 |
| WO | WO2021139685 A1 | 7/2021 |
| WO | WO2021139809 A1 | 7/2021 |
| WO | WO2021147494 A1 | 7/2021 |
| WO | WO2021147792 A1 | 7/2021 |
| WO | WO2021164738 A1 | 8/2021 |
| WO | WO2021173901 A1 | 9/2021 |
| WO | WO2021175331 A1 | 9/2021 |
| WO | WO2021180123 A1 | 9/2021 |
| WO | WO2021190627 A1 | 9/2021 |
| WO | WO2021208308 A1 | 10/2021 |
| WO | WO2021215980 A1 | 10/2021 |
| WO | WODM217452 | 10/2021 |
| WO | WO2021225494 A1 | 11/2021 |
| WO | WO2021230791 A1 | 11/2021 |
| WO | WO2021233205 A1 | 11/2021 |
| WO | WO2022042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
Extended European Search Report for Application No. 23168891.2 dated Jun. 27, 2023 (9 pages).
Chinese Patent Office Action for Application No. 202310431358.9 dated May 26, 2026 (19 pages including English translation).

* cited by examiner

INDICIA

GARDEN TOOL POWER SOURCE COMPARTMENT HAVING DRAINAGE

CROSS-REFERENCE TO RELATED APPLICATIONS

This application claims priority to U.S. Provisional Patent Application No. 63/332,863, filed on Apr. 20, 2022 and to U.S. Provisional Patent Application No. 63/374,178, filed on Aug. 31, 2022, the entire contents of which are incorporated herein by reference.

BACKGROUND

The present disclosure relates to a garden tool, such as a robotic lawn mower having a compartment for receiving a battery pack therein.

SUMMARY

In one aspect, the disclosure provides a garden tool. The garden tool includes a prime mover, a housing, a power source, and a door. The housing defines a power source compartment. The housing also defines a first aperture and a second aperture each in communication with the power source compartment. The power source is configured to provide power to the prime mover. The power source is removably receivable in the power source compartment. The door is configured to move between a closed position in which the first aperture is closed and an open position in which the first aperture is open. The second aperture is configured to provide fluid communication between the power source compartment and an external environment for draining fluid from the power source compartment.

Alternatively or additionally, in any combination: a stopper configured to selectively close the second aperture, wherein the stopper is movable between a draining position in which the second aperture is in fluid communication with the external environment for draining fluid and a stopped position in which the second aperture is closed; wherein the stopper is configured to move to the stopped position when the power source is inserted into the power source compartment and to move to the draining position when the power source is removed from the power source compartment; a linkage operably coupled to the stopper and engageable by the power source in the power source compartment; wherein the stopper is configured to move to the stopped position when the door is in the closed position and to move to the draining position when the door is in the open position; a linkage operably coupled between the stopper and the door; the linkage is disposed at least partly outside the power source compartment; an electrical terminal disposed in the power source compartment, the electrical terminal configured to electrically couple the power source to the prime mover; wherein the garden tool is a robotic lawn mower comprising a plurality of wheels operatively coupled to the prime mover and configured to convert tractive effort into motion of the robotic lawn mower on a support surface, and a blade configured to cut vegetation.

In another aspect, the disclosure provides a garden tool. The garden tool includes a housing defining a power source compartment, a power source configured to provide power to a prime mover, the power source receivable in the power source compartment, and a door configured to selectively close the power source compartment. The garden tool also includes an aperture defined in the housing and configured to provide fluid drainage from the power source compartment independent of the door.

Alternatively or additionally, in any combination: a stopper configured to selectively close the aperture, wherein the stopper is movable between a draining position in which the aperture is in fluid communication with an external environment for draining fluid and a stopped position in which the aperture is closed; a linkage operably coupled to the stopper and engageable by the power source in the power source compartment, wherein the linkage is configured to move the stopper to the stopped position when the power source is inserted into the power source compartment and to move the stopper to the draining position when the power source is removed from the power source compartment; a linkage operably coupled between the stopper and the door, wherein the linkage is configured to move the stopper to the stopped position when the door is in the closed position and to move the stopper to the draining position when the door is in the open position; an electrical terminal disposed in the power source compartment, the electrical terminal configured to electrically couple the power source to the prime mover.

In yet another aspect, the disclosure provides an electric lawn mower having a housing defining a power source compartment, a prime mover, a power source configured to provide power to the prime mover, the power source removably receivable in the power source compartment, a plurality of wheels operatively coupled to the prime mover and configured to convert tractive effort into motion of the robotic lawn mower on a support surface, a blade configured to cut vegetation, and a door configured to selectively open and close the power source compartment. The power source compartment is selectively drainable other than through the door.

Alternatively or additionally, in any combination: a stopper configured to selectively close a drain aperture, wherein the stopper is movable between a draining position in which the drain aperture is in fluid communication with an external environment for draining fluid and a stopped position in which the drain aperture is closed; a linkage operably coupled to the stopper and engageable by the power source in the power source compartment, wherein the linkage is configured to move the stopper to the stopped position when the power source is inserted into the power source compartment and to move the stopper to the draining position when the power source is removed from the power source compartment; a linkage operably coupled between the stopper and the door, wherein the linkage is configured to move the stopper to the stopped position when the door is in a closed position and to move the stopper to the draining position when the door is in an open position; an electrical terminal disposed in the power source compartment, the electrical terminal configured to electrically couple the power source to the prime mover; wherein the housing defines a top and a bottom generally opposite the top, wherein the blade is disposed closer to the bottom than the top, wherein the door is at least partially disposed on the top, and wherein the power source compartment is selectively drainable through the bottom.

In yet another aspect, the disclosure provides a power source containment assembly for a garden tool. The power source containment assembly includes a housing defining a power source compartment configured to receive a removable power source. The power source containment assembly also includes an electrical terminal configured to electrically couple with the removable power source. The electrical terminal is disposed in the power source compartment. The power source containment assembly also includes a door configured to selectively close the power source compartment and an aperture defined in the housing. The aperture is configured to provide fluid drainage from the power source compartment independent of the door.

Alternatively or additionally, in any combination: a stopper configured to selectively close the aperture, wherein the stopper is movable between a draining position in which the aperture is in fluid communication with an external environment for draining fluid and a stopped position in which the aperture is closed; wherein the stopper is configured to move to the stopped position when the power source is inserted into the power source compartment and to move to the draining position when the power source is removed from the power source compartment; wherein the stopper is configured to move to the stopped position when the door is in the closed position and to move to the draining position when the door is in the open position; a linkage operably coupled to the stopper and engageable by the power source in the power source compartment; a linkage operably coupled between the stopper and the door; an electrical terminal disposed in the power source compartment, the electrical terminal configured to electrically couple with the power source.

In a first further aspect, the disclosure provides a garden tool. The garden tool includes a power source configured to provide power to a prime mover, the power source removably disposed in a power source compartment. The garden tool further includes a door configured to move between a closed position in which the power source compartment is closed and an open position in which the power source compartment is open, the door being configured to slide from the closed position to an intermediate position, and to rotate from the intermediate position to the open position.

Alternatively or additionally, in any combination: wherein the door is inhibited from rotating between the closed position and the intermediate position; a hinge including a hinge body and a pivot shaft, the hinge body configured to slide relative to the pivot shaft between the closed position and the intermediate position of the door, and configured to rotate about the pivot shaft between the intermediate position and the open position of the door; an actuator disposed directly adjacent the door; wherein the door is configured to slide away from the actuator from the closed position to the intermediate position; wherein the door is configured to sealingly engage the actuator in the closed position; a hinge including a hinge seat, a shaft seat, a pivot shaft supported by the shaft seat, and a hinge body translatable relative to the pivot shaft between a first position in which the hinge seat inhibits rotation of the hinge body about the pivot shaft and a second position in which the hinge body is rotatable about the pivot shaft; wherein the first position corresponds to the closed position of the door and the second position corresponds to the intermediate position of the door;

In a second further aspect, the disclosure provides a garden tool. The garden tool includes a power source configured to provide power to a prime mover, the power source disposed in a power source compartment. The garden tool further includes an actuator configured to stop the prime mover, and a door configured to seal against the actuator.

Alternatively or additionally, in any combination: wherein the door is configured to selectively open and close the power source compartment, and wherein the power source is removable from the power source compartment; wherein the door is configured to move between a first position in which the power source compartment is closed and a second position in which the power source compartment is open;

wherein a water tight seal is provided in the first position, and wherein the door is configured to slide from the first position to an intermediate position to disengage the water tight seal, and to rotate from the intermediate position to the second position; wherein the door is inhibited from rotating between the first position and the intermediate position; a hinge coupled to the door, the hinge including a hinge body and a pivot shaft, the hinge body configured to slide relative to the pivot shaft between a closed position and an intermediate position, and configured to rotate about the pivot shaft between the intermediate position and an open position, wherein the door is closed in the closed position and the door is open in the open position; wherein the door is configured to slide away from the actuator to open the power source compartment; a hinge including a hinge seat, a shaft seat, a pivot shaft supported by the shaft seat, the pivot shaft defining a pivot axis, and a hinge body translatable relative to the pivot shaft between a first position in which the hinge seat inhibits rotation of the hinge body about the pivot axis and a second position in which the hinge body is rotatable about the pivot axis; wherein the first position corresponds to a closed position in which the door closes the power source compartment.

In yet a third further aspect, the disclosure provides a power source containment area for a garden tool. The power source containment area includes a power source compartment configured to receive a removable power source, and a door configured to selectively seal the power source compartment. The door is configured to slide to break the seal and configured to pivot to open the power source compartment.

Alternatively or additionally, in any combination: an actuator configured to stop a prime mover coupled to the removable power source, wherein the door is configured to sealingly engage the actuator; wherein the door is further configured to slide away from the actuator to break the seal.

Other aspects of the disclosure will become apparent by consideration of the detailed description and accompanying drawings.

5

Figure 6:
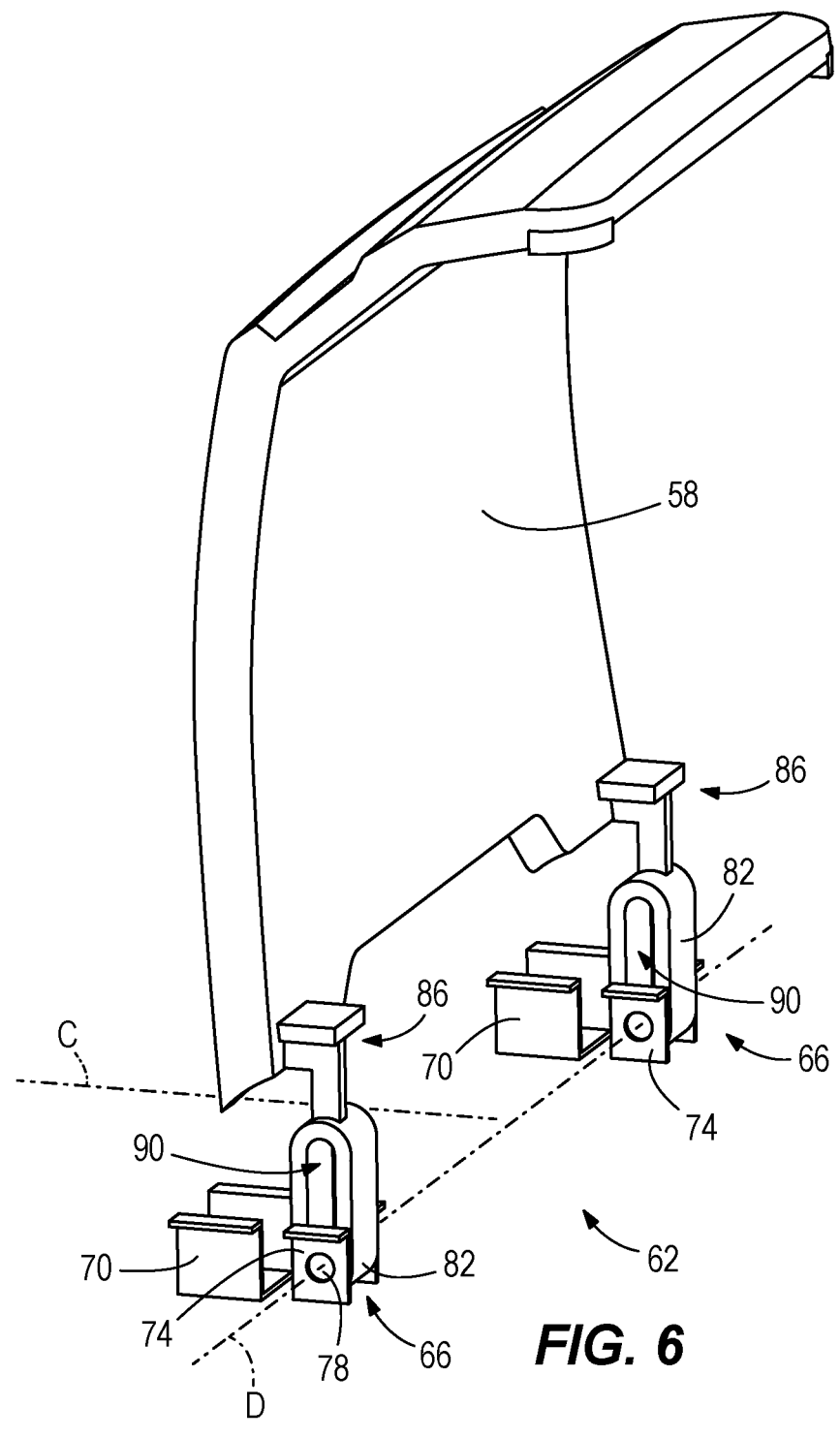
FIG. 6 is a perspective view of a hinge mechanism supporting the power source compartment door in the open position.
Figures 8, 9, 10:
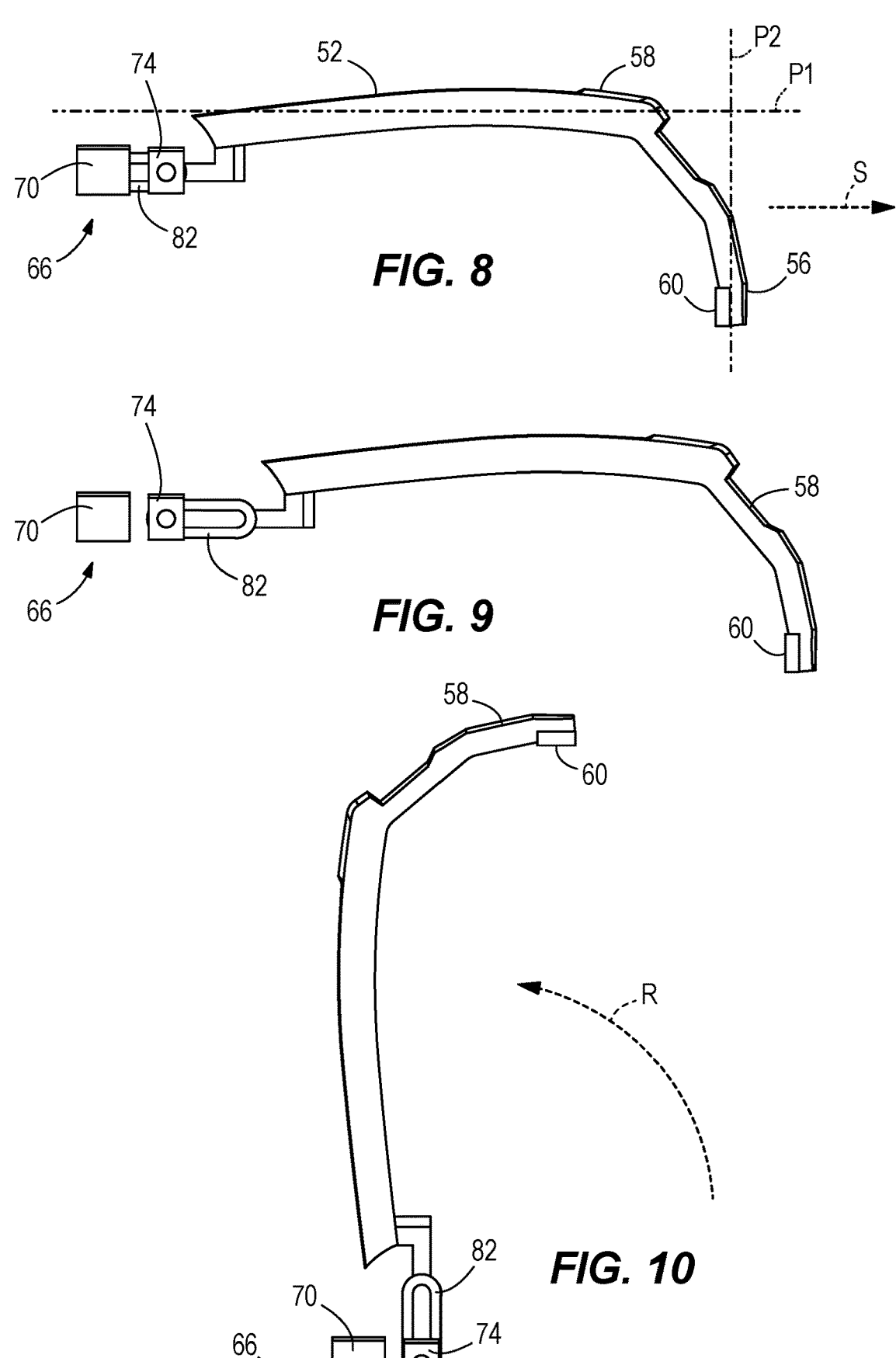
FIG. 8 is a side view of the hinge mechanism of FIG. 6, with the hinge mechanism in the closed position.
FIG. 9 is a side view of the hinge mechanism of FIG. 6, with the hinge mechanism in the intermediate position.

FIG. 10 is a side view of the hinge mechanism of FIG. 6, with the hinge mechanism in the open position.

Figure 1:
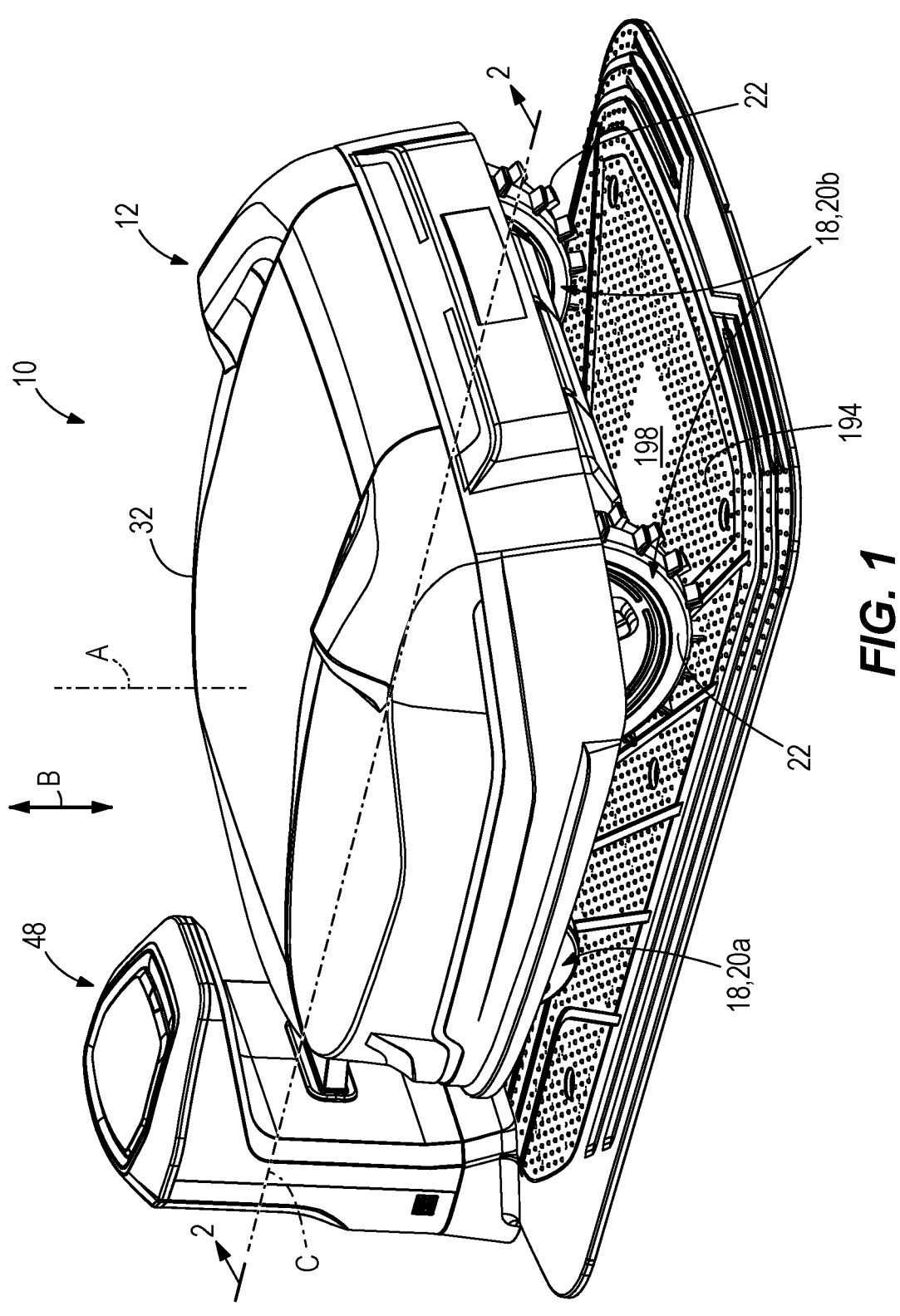
FIG. 1 is a top perspective view of an autonomous lawn mower system embodying the disclosure.
Figures 11, 12:
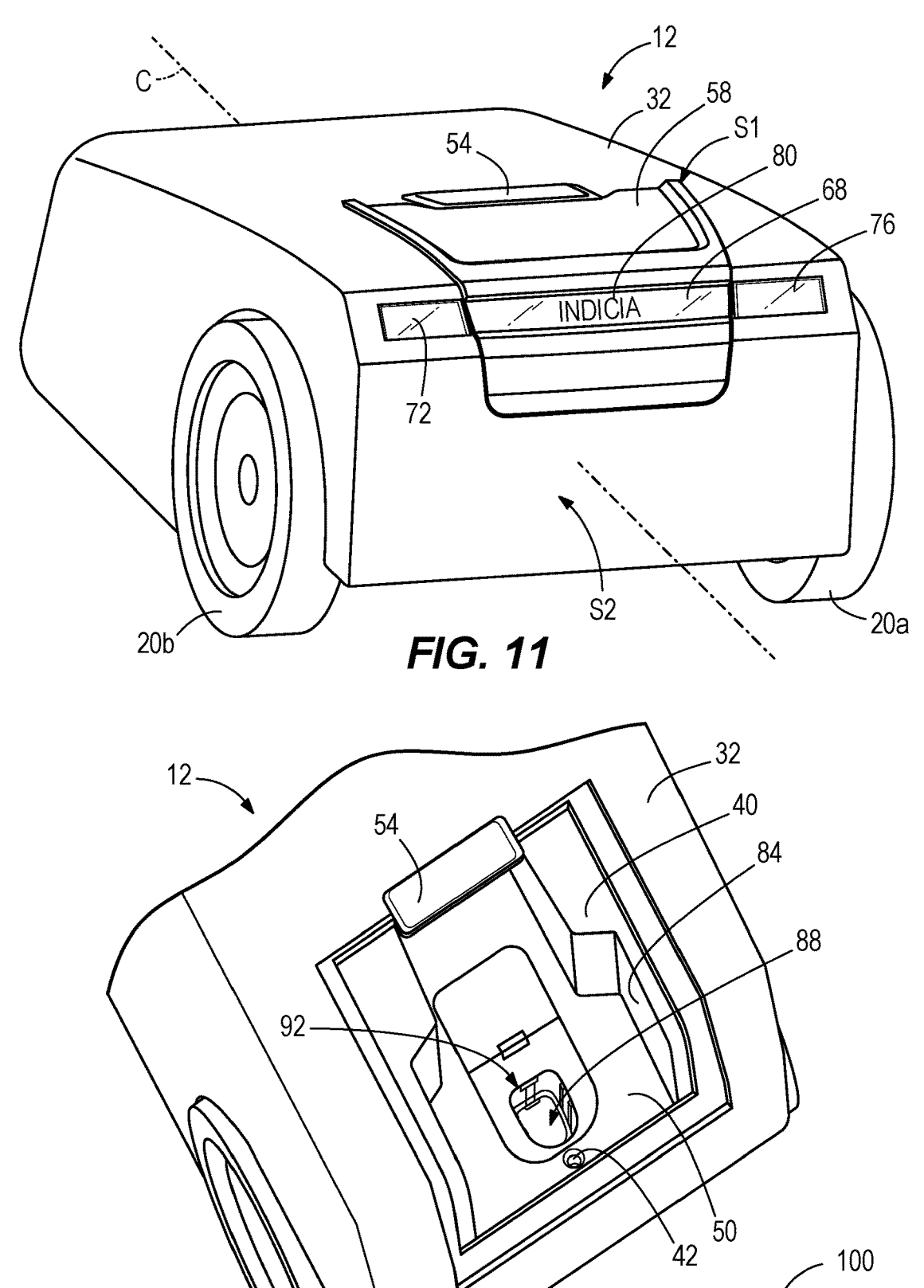

FIG. 11 is a rear perspective view of the autonomous lawn mower of FIG. 1.

FIG. 12 is a perspective view of the housing defining the power source compartment of the autonomous lawn mower of FIG. 1.

Figure 13:
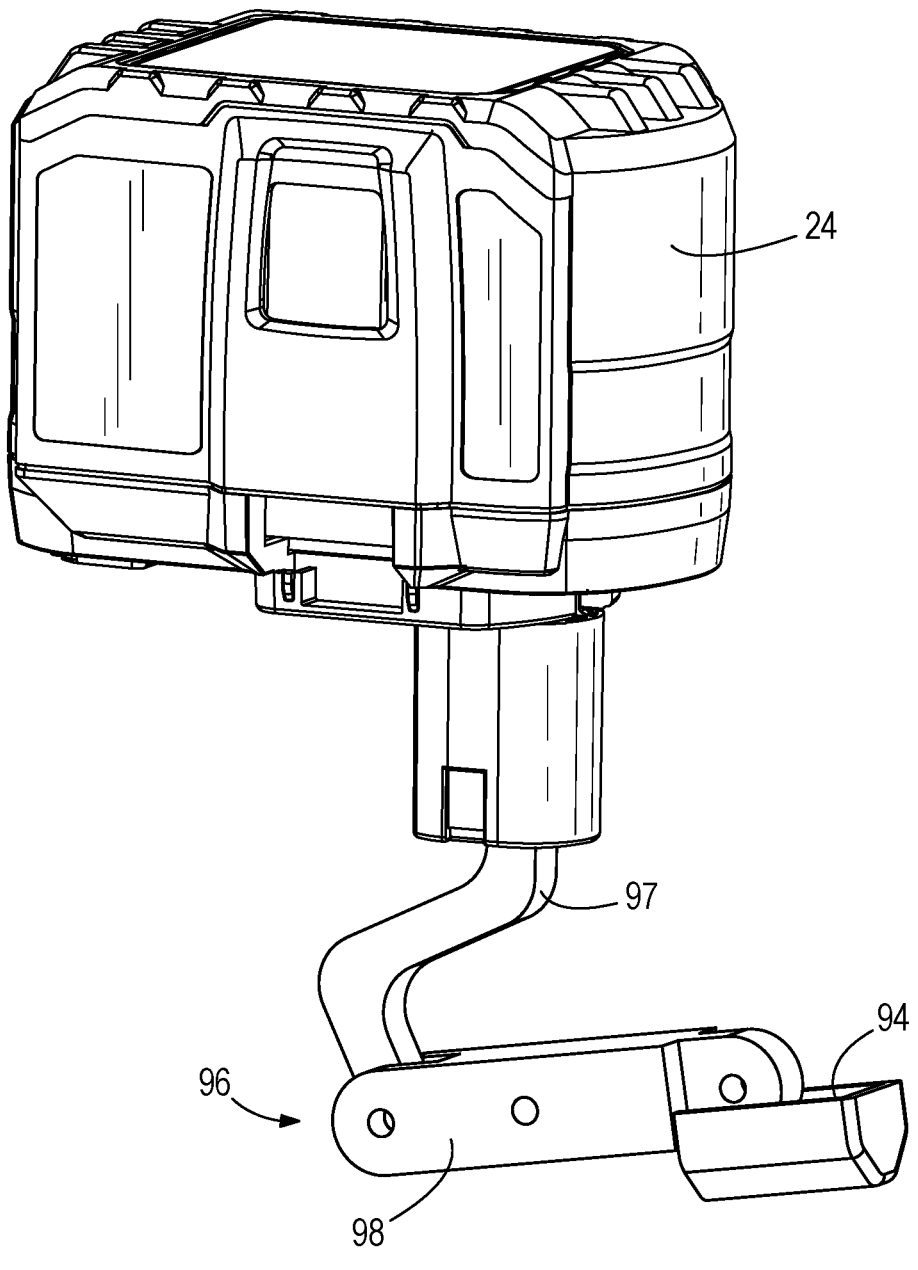

FIG. 13 is a perspective view of a first implementation of a drain stopper linkage for the power source compartment of FIG. 12.

Figure 14:
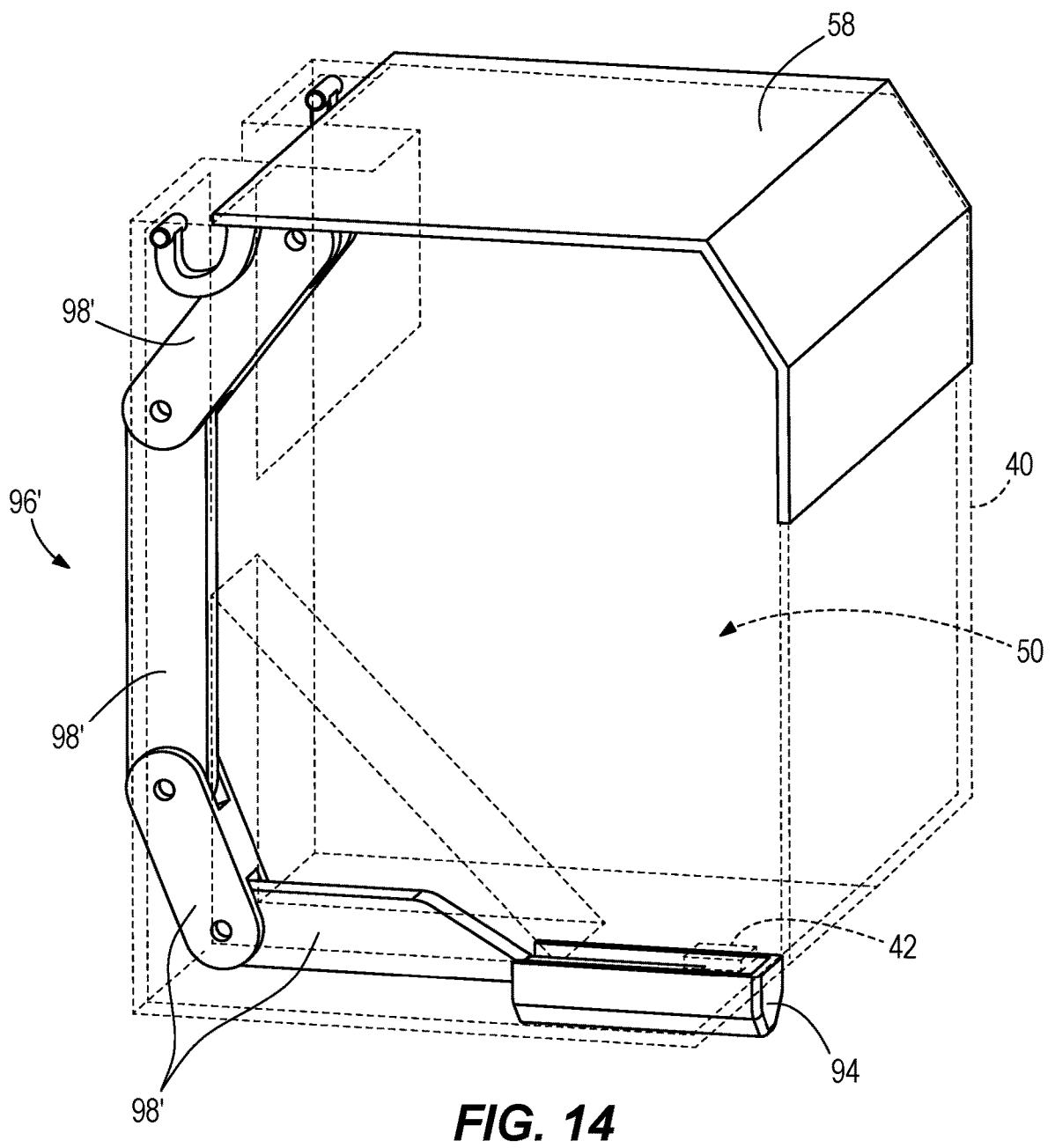

FIG. 14 is a perspective view of a second implementation of a drain stopper linkage for the power source compartment of FIG. 12.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. Also, it is to be understood that the phraseology and terminology used herein are for the purpose of description and should not be regarded as limiting. The terms "approximately", "about", "generally", "substantially", and the like should be understood to mean within standard tolerances, as would be understood by one of ordinary skill in the art, unless specific tolerances are defined below.

Figure 2:
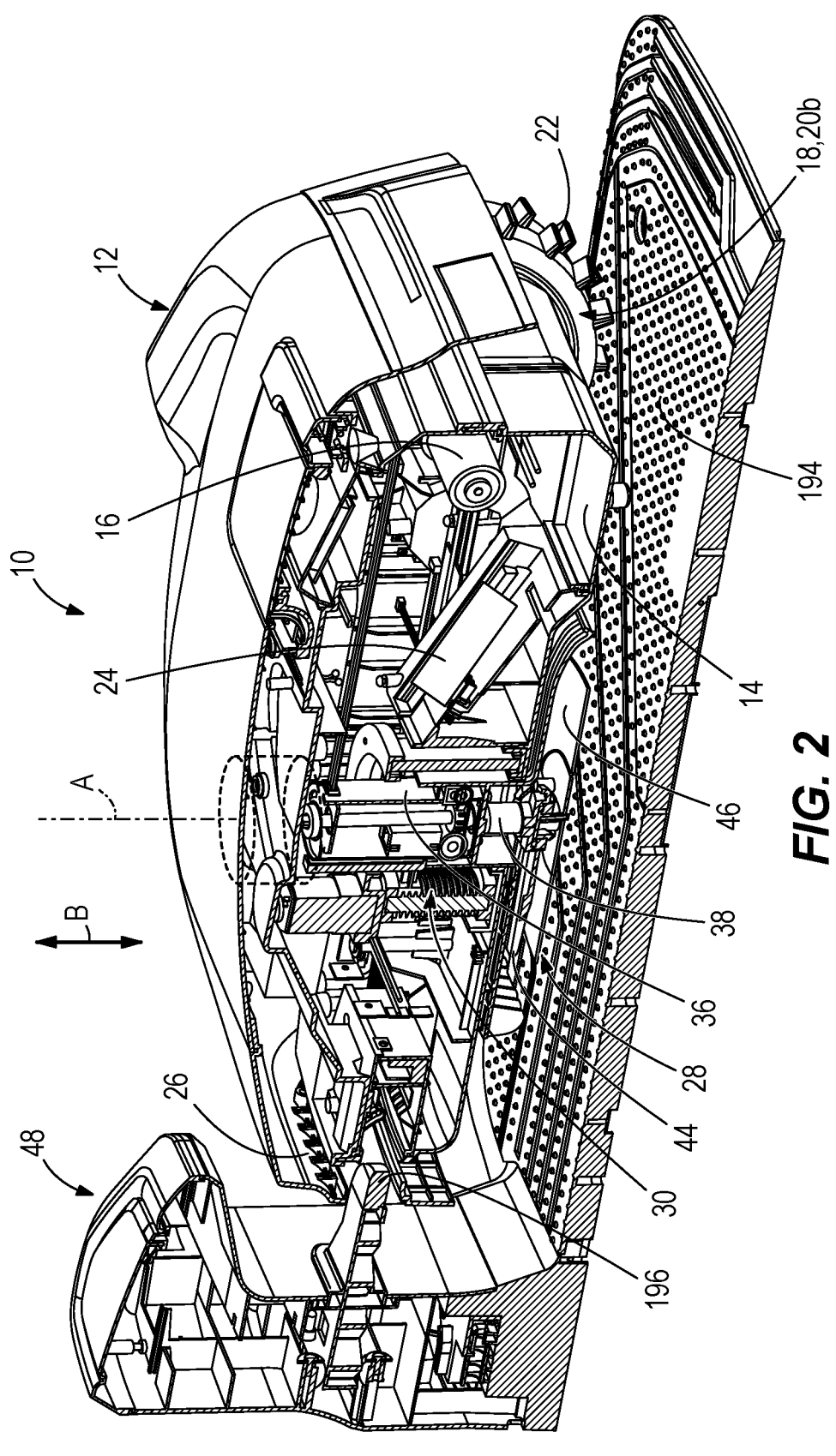
FIG. 2 is a cross-sectional view of the lawn mower system of FIG. 1 taken through line 2-2 in FIG. 1.

FIGS. 1-2 illustrate a garden tool system 10. For example, the garden tool system 10 may include a garden tool 12, such as a lawn mower 12 (as shown), or in other implementations may include a tool for sweeping debris, vacuuming debris, clearing debris, collecting debris, moving debris, etc. Debris may include plants (such as grass, leaves, flowers, stems, weeds, twigs, branches, etc., and clippings thereof), dust, dirt, jobsite debris, snow, and/or the like. For example, other implementations of the garden tool 12 may include a vacuum cleaner, a trimmer, a string trimmer, a brush cutter, a hedge trimmer, a sweeper, a cutter, a plow, a debris blower, a snow blower, etc. In the illustrated implementation, the garden tool system 10 includes the lawn mower 12 and a charging station 48. The garden tool 12 may be autonomous, semi-autonomous, or not autonomous.

Figure 3:
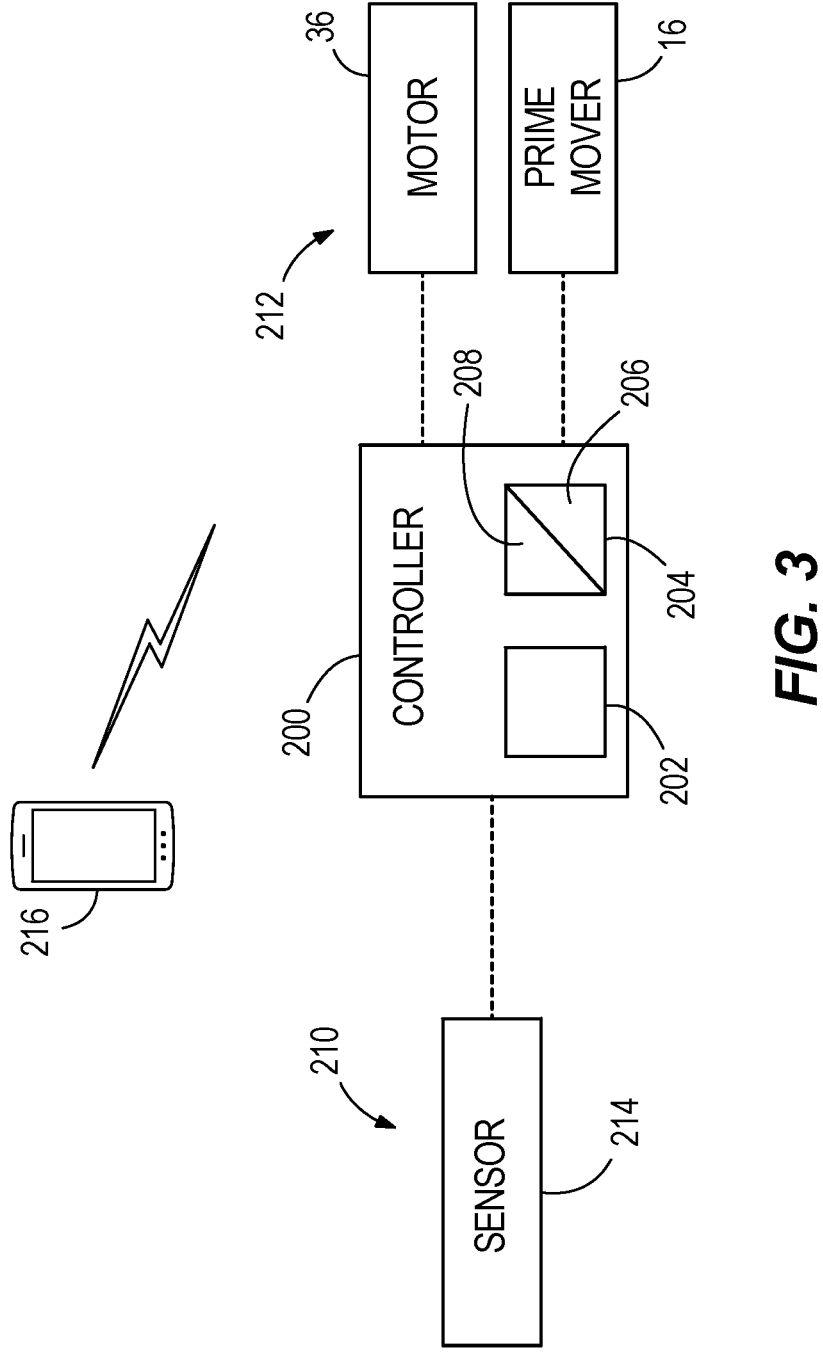
FIG. 3 is a schematic diagram illustrating a control system for the lawn mower system of FIG. 1.

For example, as illustrated in FIG. 3, the lawn mower 12 may include a controller 200 having a programmable processor 202 (e.g., a microprocessor, a microcontroller, or another suitable programmable device), a memory 204, and a human-machine interface 216 (which may include a mobile device, other remote device, and/or actuator(s) on the lawn mower 12 itself). The memory 204 may include, for example, a program storage area 206 and a data storage area 208. The program storage area 206 and the data storage area 208 can include combinations of different types of memory 204, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The controller 200 may also, or alternatively, include integrated circuits and/or analog devices, e.g., transistors, comparators, operational amplifiers, etc., to execute the logic and control signals described herein. The controller 200 includes a plurality of inputs 210 and outputs 212 to and from various components of the lawn mower 12. For example, the controller 200 may control the motor 36 and/or the prime mover 16, e.g., to control the movement of the lawn mower 12 along the support surface. The controller 200 is configured to provide control signals to the outputs 212 and to receive data and/or signals (e.g., sensor data, user input signals, etc.) from the inputs 210, such as a sensor 214. The inputs 210 and outputs 212 are in communication with the controller 200, e.g., by way of hard-wired and/or wireless communications such as by satellite, internet, mobile telecommunications technology, a frequency, a wavelength, Bluetooth®, or the like. The controller 200 may include a navigation system, which may include one or more of a global positioning system (GPS), beacons, sensors such as image sensors, ultrasonic sensors, wire sensors, and an algorithm for navigating an area to be mowed. However, in other implementations, the lawn mower 12 may be non-autonomous.

With reference to FIG. 2, the lawn mower 12 includes a deck 14 for supporting various components of the lawn mower 12, as will be described in greater detail below. The lawn mower 12 includes at least one prime mover 16 cooperating with a plurality of wheels 18 for providing tractive effort to move the lawn mower 12 across a support surface, such as the charging station 48 or a lawn to be mowed. The at least one prime mover 16 may be supported by the deck 14. For example, the at least one prime mover 16 may include one or more electric motors 16 in the illustrated implementation. Thus, the lawn mower 12 may be embodied as an electric lawn mower 12. However, in other implementations the prime mover 16 may include another type of motor, a gasoline engine, or the like, in any suitable quantity and combination.

The lawn mower 12 also includes the plurality of wheels 18 (FIG. 1), which may be supported by the deck 14 (FIG. 2), for converting the tractive effort into motion of the lawn mower 12 on the support surface. Each of the plurality of wheels 18 supports a tire 22 in the illustrated implementation. However, the plurality of wheels 18 may support any combination of one or more of tires, continuous tracks, or the like in other implementations. The plurality of wheels 18 includes two front wheels 20a and two rear wheels 20b, but other quantities of wheels may be employed in other implementations. In the illustrated implementation, each of the two rear wheels 20b is operatively coupled to its own prime mover 16 (such as two electric motors, one for each respective rear wheel 20b) to apply torque thereto, and the two front wheels 20a are not driven. However, other torque-transmission arrangements can be used in other implementations with any quantity and combination of driven and non-driven wheels, any number of wheels being driven by a single prime mover, and any number of prime movers.

The lawn mower 12 includes a power source 24 (FIG. 2), such as a removable and rechargeable battery, for powering the at least one prime mover 16 such that the lawn mower 12 can perform a lawn mowing operation in a cordless fashion. The power source 24 may include one or more lithium-ion battery cells, and/or other battery chemistries. The power source 24 may be removable from the lawn mower 12. In other implementations, the at least one prime mover 16 may be powered by other power sources, such as solar panels, fuel cells, compressed fluid, fuel, or the like. The lawn mower 12 includes a battery charging contact 26 for receiving a charge from an external power source (not shown) for charging the power source 24.

With reference to FIGS. 1 and 2, the charging station 48 includes a docking pad 194 and a battery charging terminal 196. The docking pad 194 defines a generally planar surface 198, with "generally planar surface" being defined as providing enough of a portion of a planar surface, i.e., comprised of a single continuous surface or a plurality of separated (discontinuous) surfaces, for the lawn mower 12 to drive up onto and be supported by during a charging operation. The battery charging terminal 196 is configured to engage with the battery charging contact 26 on the lawn mower 12 to provide an electrical connection therebetween for charging the power source 24 (e.g., battery).

The lawn mower 12 includes a cutting module 30 (FIG. 2), which may be supported by the deck 14. The cutting module 30 includes a blade module 28 (which is one example herein of a driven implement) and a motor 36 configured to drive the blade module 28. In the illustrated implementation, the blade module 28 includes one or more blades 44, and the motor 36 drives the blade module 28 about an axis of rotation A. In other implementations, the blade module 28 includes a reciprocal trimming unit (not shown) having linearly reciprocating trimming blades, and the motor 36 drives the trimming blades of the trimming unit to move reciprocally. In yet other implementations, the blade module 28 includes a string (not shown), as in a string trimmer, and the motor 36 drives the string about the axis of rotation A. In yet other implementations, the blade module 28 includes a roller blade (not shown), such as a reel blade or squirrel cage blade, and the motor 36 drives the roller blade to roll or rotate about an axis that is generally parallel with the support surface (e.g., generally horizontal). In yet other implementations, the blade module 28 includes an auger (not shown), such as snow blower auger, and the motor 36 drives the auger to roll or rotate about an axis that is generally parallel with the support surface (e.g., generally horizontal). In yet other implementations, the blade module 28 includes a fan (not shown), such as a blower fan, and the motor 36 drives the fan in rotation. Other types of blades are possible in addition to the examples given above. Furthermore, other types of driven implements are also possible, including the blades above as well as other non-blade implements that are driven by the motor 36, such as brushes.

The motor 36 includes a rotatable drive shaft 38 operably coupled to the blade module 28 (or any other driven implement in accordance with any implementation of the disclosure). In the illustrated implementation, the drive shaft 38 is disposed coaxially with the axis of rotation A. In other implementations, the drive shaft 38 may be disposed parallel with (e.g., offset from) or transverse to the axis of rotation A. The axis of rotation A defines an axial direction B. The axial direction B is typically a vertical direction with respect to the support surface on which the lawn mower 12 rides, e.g., up and down with respect to gravity, when the lawn mower 12 is in use. However, in certain implementations, the axis of rotation A (and thus the axial direction B) may be tilted relative to the vertical direction, for example by 1 to 10 degrees, preferably by 3 to 8 degrees, and more preferably by 5 to 6 degrees. In certain implementations, the axis of rotation A may be tilted forward in the travelling direction relative to the vertical direction.

The blade module 28 (FIG. 2) may include the one or more blades 44 supported by a blade holder 46. In the illustrated implementation, each of the one or more blades 44 is configured to cut vegetation, such as grass and other plants. In some implementations, each of the one or more blades 44 may include one or more flailing blades (e.g., made of plastic) and/or one or more strings for cutting vegetation. In yet other implementations, one or more blades 44 may include any other type of blade for cutting vegetation, such as a knife-edge cutter, a serrated cutter, a roller cutter, any of the cutters described above, or any other cutter. In yet other implementations, the blade holder 46 may support other types of blades, such as fan blades, an auger, etc. In yet other implementations, the blade holder 46 may be formed integrally with a blade or blades, a knife edge or edges, teeth, a string or strings, or any other implement in any combination. Thus, the blade holder 46 may support any type of garden tool implement and may be also referred to as an implement holder 46.

The lawn mower 12 also includes an outer housing 32 supported by the deck 14. The outer housing 32 generally protects certain components of the lawn mower 12 from dust and debris.

The lawn mower 12 defines a longitudinal axis C that extends in a direction of travel. A front, a rear, and relative terms "forward", "rearward", "lateral", etc. are all defined relative to the longitudinal axis C (and thus the direction of travel) as is understood in the art. Top, bottom, upper, lower, and the like, are relative terms defined relative to an axis that is normal to the support surface on which the lawn mower 12 travels. The axis normal to the support surface is generally perpendicular to the direction of travel.

Figure 4:
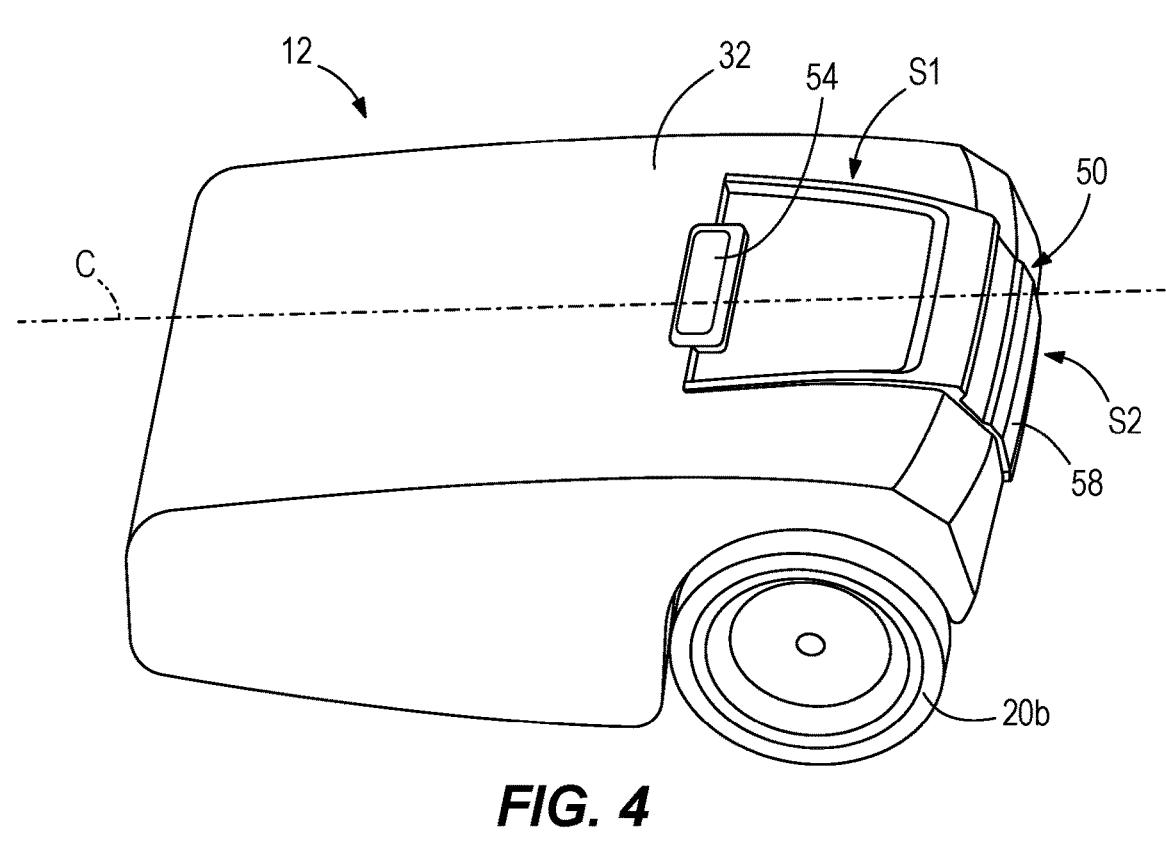
FIG. 4 is a top perspective view of the autonomous lawn mower of FIG. 1.

With reference to FIGS. 4 and 5, the lawn mower 12 includes a power source compartment 50 for receiving the power source 24. The power source compartment 50 may be disposed anywhere on the lawn mower 12, such as proximate the top, the bottom, the sides, the front, the rear, the center, or offset from the center in the lateral direction, etc., in any combination thereof. In the illustrated implementation, the power source compartment 50 is disposed at a rear of the lawn mower 12 and laterally between the two rear wheels 20b. The power source compartment 50 is disposed directly adjacent a housing surface structure 54 forming a portion of the outer surface of the lawn mower 12, such as an actuator or actuators, a display, any other structure on or adjacent the outer housing 32, or a portion of the outer housing 32 itself. In the illustrated implementation, which is not to be regarded as limiting, the housing surface structure 54 includes an actuator configured as a stop button, though other types of actuators serving any other purpose may be employed, such as a switch, a slider, a rocker, a lever, a dial, a touch pad, an actuatable display, etc. More specifically, the power source compartment 50 is disposed rearwards of the housing surface structure 54 that is disposed generally centrally and is accessible from a top side of the lawn mower 12. The housing surface structure 54 may be configured as an emergency stop button (or other type of emergency stop actuator) to stop the prime mover 16. For example, the housing surface structure 54 may be configured to disconnect the prime mover 16 from the power source 24, or to stop the prime mover 16 by any other means. The housing surface structure 54 may be configured to be actuated manually.

Figure 5A:
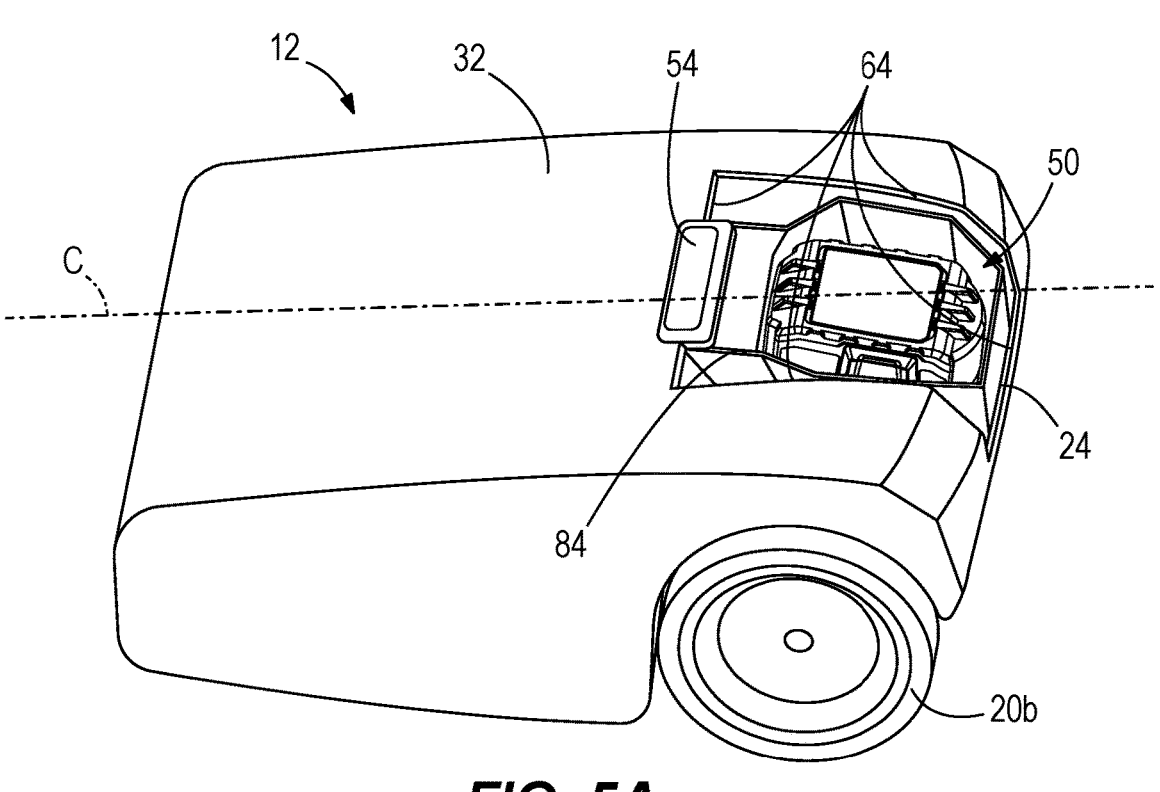
FIG. 5A is a top perspective view of the autonomous lawn mower of FIG. 4, with the power source compartment door removed for clarity.
Figure 5B:
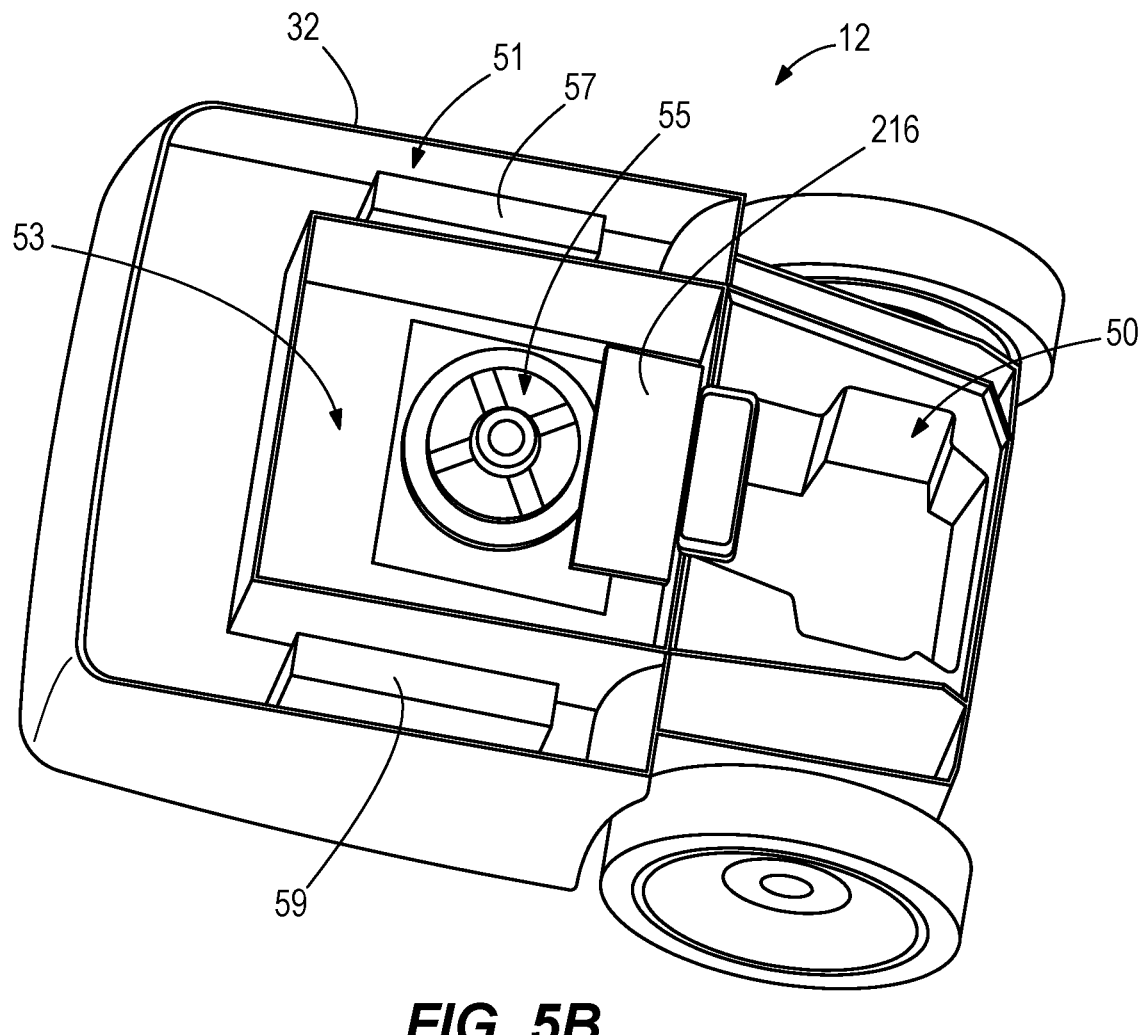
FIG. 5B is another top perspective view of the autonomous lawn mower of FIG. 4, with the power source compartment door and the outer housing removed for clarity.

With reference to FIG. 5B, the mower 12 defines at least three interior compartments: the power source compartment 50, an electronics compartment 51, and a mechanical compartment 53 for a height adjustment module 55. The height adjustment module 55 is configured to adjust a height of the one or more blades 44 with respect to the vegetation being cut. The human-machine interface 216, which may be embodied as one or more actuators such as electronic control buttons, may be disposed in the mechanical compartment 53 (as illustrated in FIG. 5B) along with its corresponding electrical components (such as wires, circuit board, etc.); in other implementations, the human-machine interface 216 may be disposed in any other compartment on the mower 12. The terms "electronics compartment" and "mechanical compartment" are not to be regarded as limiting said compartments to only electrical and only mechanical components (respectively) therein; the electronics compartment 51 may have any combination of electronic and/or mechanical components therein, and the mechanical compartment 53 may have any combination of electronic and/or mechanical compartments therein. Thus, the electronics compartment 51 may also be referred to herein as a first compartment, and the mechanical compartment 53 may also be referred to herein as a second compartment. No water seal treatment is provided for the electronics compartment 51 nor the mechanical compartment 53 as a whole. Instead, each electronic unit (e.g., any circuit board(s), wiring, control panel(s), etc., such as a battery management system 57 (BMS), a microcontroller unit 59 (MCU), the human-machine interface 216, and others) is per se water sealed by pouring sealant. That is, each electronic unit is individually and directly sealed by sealant disposed directly thereon. This dispenses with the need to provide a water seal to the housing of each compartment as a whole (i.e., the electronics compartment 51 and the mechanical compartment 53), and greatly reduces costs. The power source 24 and an electrical terminal 92 (which is an interface for electrically coupling the power source 24 to the prime mover 16) that receives the power source 24 would be difficult to water-seal directly by disposing sealant. Therefore, water seal measures, described below, are applied to the power source compartment 50 as a whole. Among others, the power source compartment 50 is isolated from the electronics compartment 51 and the mechanical compartment 53 by an elastic sealing material 64 (FIG. 5B).

The power source compartment 50 is defined in a housing 40 (see FIGS. 12 and 14). The housing 40 may be coupled to the deck 14, may be a portion of the deck 14, or may be a portion of the outer housing 32. The lawn mower 12 includes a door 58 that is movable between an open position in which the power source compartment 50 is open and a closed position in which the power source compartment 50 is closed. The door 58 forms part of the outer housing 32 (e.g., is disposed in a void in the outer housing 32 and may be flush with the outer housing 32). The door 58 may be disposed anywhere on the lawn mower 12, such as the top, the bottom, the sides, the front, the rear, the center, or offset from the center in the lateral direction, etc., or in any combination thereof. For example, the door 58 may include a first portion 52 generally disposed on a first side S1 (FIG. 4) of the lawn mower 12 and a second portion 56 depending from the first portion 52 and generally disposed on a second side S2 of the lawn mower 12. The first side S1 is generally defined by a first imaginary plane P1 (FIG. 8), and the second side S2 is generally defined by a second imaginary plane P2. The first and second imaginary planes P1, P2 are orthogonal to each other. The first portion 52 intersects the first imaginary plane P1 and the second portion 56 intersects the second imaginary plane P2 in a location not intersecting the first imaginary plane P1. Thus, the first and second portions 52, 56 need not be completely coincident with the first and second imaginary planes P1, P2. Rather, this description is intended to define the door 58 as non-planar and generally disposed on two orthogonal sides (S1, S2) of the lawn mower 12, which may entail sealing the door 58 in two directions as will be described in greater detail below. In some implementations, the door 58 need not be disposed on two orthogonal sides of the lawn mower 12 and may have any shape or configuration that selectively opens and closes the power source compartment 50.

In some implementations, when the door 58 is in the closed position (FIG. 4, FIG. 8), the power source compartment 50 is sealed so that water and other debris is significantly inhibited from entering the compartment 50. In other implementations, when the door 58 is in the closed position, the power source compartment 50 may be at least partially sealed. When the door 58 is in the open position (FIG. 6, FIG. 10), the power source compartment 50 is unsealed, and access to the compartment 50 is provided (e.g., for installation and removal of the power source 24). As will be described in further detail below, the door 58 is coupled to a hinge mechanism 62 (FIG. 6) which allows the door 58 to move relative to the outer housing 32, thereby opening or closing the power source compartment 50, without interfering with other components of the lawn mower 12. In order for the door 58 to create a water-tight seal of the power source compartment 50 in some implementations, there exists effectively no clearance between the door 58 and other components of the lawn mower 12 to seal the power source compartment 50. The seal may exist between the door 58 and any component of the lawn mower 12, such as the housing surface structure 54, the outer housing 32, and/or the elastic sealing material 64 (FIGS. 5A and 5B). The elastic sealing material 64 may be disposed on the outer housing 32 and/or on the door 58. The elastic sealing material 64 may be disposed around an entire perimeter thereof, or around at least a portion of the perimeter thereof in other implementations. The elastic sealing material 64 seals between the door 58 and the outer housing 32 when the door 58 is in the closed position. The elastic sealing material 64 seals the power source compartment 50 against water intrusion to protect the power source 24. The door 58 engages the housing surface structure 54 in the closed position to, at least in part, provide the water-tight seal. The door 58 may directly engage the housing surface structure 54 in the closed position or may indirectly engage the housing surface structure 54 by way of the elastic sealing material 64. As such, the door 58 seals against the housing surface structure 54. As the door 58 moves from the closed position to the open position, the hinge mechanism 62 creates clearance between the door 58 and the outer housing 32. For example, the clearance allows for the seal to be broken between the door 58 and the housing surface structure 54, and between the door 58 and the power source compartment 50. In the illustrated implementation, the door 58 and the hinge mechanism 62 are oriented such that the power source compartment 50 is accessible from the rear and/or the top of the lawn mower 12 when the door 58 is open. In other implementations, the hinge mechanism 62 can be oriented in other directions on the lawn mower 12, depending on the desired opening direction of the door 58.

Figure 7:
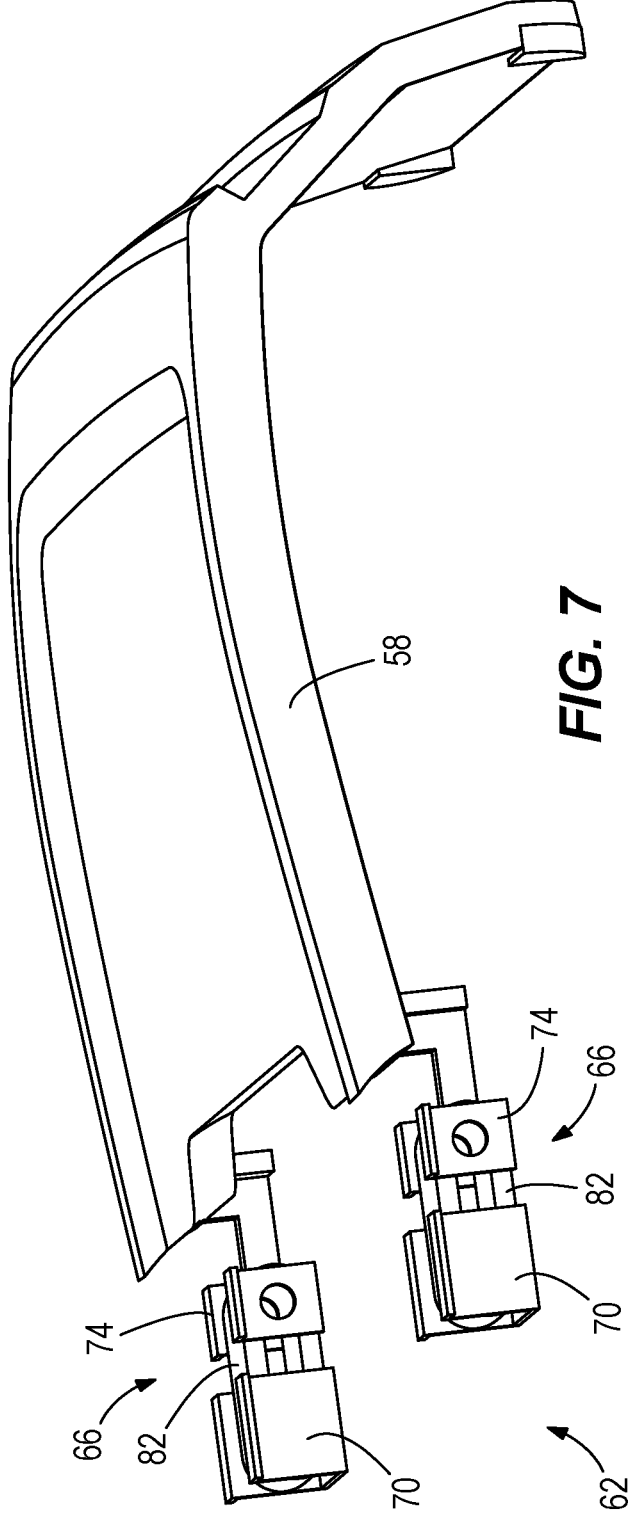
FIG. 7 is a perspective view of the hinge mechanism supporting the power source compartment door in the closed position.

With reference to FIGS. 6 and 7, the hinge mechanism 62 includes two laterally spaced apart hinges 66 guiding movement of the door 58 relative to the outer housing 32. In other implementations, the door 58 may be supported by more or fewer hinges 66. The hinges 66 are essentially identical such that only one hinge 66 need be described herein, and it is understood that description of one hinge 66 applies to all of the hinges 66.

While certain orientations and directions of the hinge 66 are described below, it should be understood that any suitable arrangements, directions, and orientations are possible. The hinge 66 includes a hinge seat 70, a shaft seat 74, and a pivot shaft 78 (FIG. 6). The hinge seat 70 is fixed relative to the deck 14. The hinge seat 70 may be coupled to the outer housing 32 and fixed relative to the outer housing 32. The hinge seat 70 may be disposed forward of the shaft seat 74. The shaft seat 74 is fixed relative to the deck 14. The shaft seat 74 may be coupled to the outer housing 32 and fixed relative to the outer housing 32. The shaft seat 74 may be formed from the same piece of material, or a separate piece of material, as the hinge seat 70. The shaft seat 74 may be disposed rearwards of the hinge seat 70 and supports the pivot shaft 78. The pivot shaft 78 is oriented transverse to the longitudinal axis C and defines a rotational axis D. The hinge 66 further includes a hinge body 82 to which a support 86 is coupled. The hinge body 82 is movable relative to the pivot shaft 78. The hinge body 82 of the illustrated implementation includes a slot 90 extending along a length thereof. The pivot shaft 78 is received within the slot 90 so that the hinge body 82 is translatable relative to the pivot shaft 78 along the slot 90, and the hinge body 82 is rotatable about the rotational axis D. The support 86 is adapted to couple the door 58 to the hinge body 82 so that the door 58 moves with the hinge body 82. In some implementations, the support 86 is integrally formed with the hinge body 82.

When the hinge 66 is in a closed position (FIGS. 7 and 8), which corresponds to the closed position of the door 58, the pivot shaft 78 is disposed within the slot 90 proximate the support 86, and the hinge body 82 extends towards a front of the lawn mower 12 and is received within the hinge seat 70. The hinge seat 70 inhibits the hinge body 82 from rotating about the pivot shaft 78. The hinge seat 70 may restrain the hinge body 82 to linear translation, e.g., parallel to the longitudinal axis C in the illustrated implementation.

To open the door 58, the support 86 is first moved away from the hinge seat 70 (e.g., rearwards relative to the hinge seat 70), so that the hinge seat 70 does not interfere with the hinge body 82. In other words, the door 58 slides in a direction S from the closed position (FIG. 8) toward an intermediate position (FIG. 9). In the intermediate position (as shown in FIG. 9), the seal between the door 58 and the housing surface structure 54 broken. Thus, sliding the door 58 breaks the seal between the door 58 and the housing surface structure 54. In the intermediate position, the pivot shaft 78 is disposed in the slot 90 distal from the support 86 and the hinge body 82 is free to rotate about the pivot shaft 78. The hinge 66 is then rotatable in a direction R about the pivot shaft 78 to an open position (FIGS. 6 and 10), which corresponds to the open position of the door 58.

The hinge 66 may include a damping member (not shown) for cushioning the parts of the hinge 66 during movement. The damping member may include an elastic material, a foam, a spring, a pneumatic device, a hydraulic device, or the like.

As discussed above, the door 58 is non-planar and includes a first portion 52 and a second portion 56 in different orthogonal planes P1, P2, respectively. Thus, the elastic sealing material 64 is sandwiched from the first side S1 and from the second side S2 of the lawn mower 12. The sliding of the door 58 in the direction S improves sealing along the second side S2 of the door 58.

A magnetic closure 60 (FIGS. 8-10) may be disposed between the door 58 and the outer housing 32 such that a magnetic force acts to hold the door 58 in the closed position. The magnetic closure 60 may include one or more of a permanent magnet(s), an electromagnet(s), a ferromagnetic material(s), a ferrimagnetic material(s), and/or any material(s) that is attracted to magnets (such as iron, nickel, cobalt, steel, manganese, gadolinium, lodestone, alloys thereof or of any suitable materials, etc.), or the like. The magnetic closure 60 may include one or more of such magnets and/or materials attracted to magnets, such as a pair of magnets, a magnet and ferromagnetic material pair, or any other suitable combination of materials that are attracted to each other by magnetic forces. The magnetic closure 60 may be disposed on the door 58 and/or on the outer housing 32 and/or on the housing surface structure 54. More than one magnetic closure 60 may be employed. The magnetic closure 60 is configured to hold the door 58 in the closed position by the magnetic force. The magnetic closure 60 may also improve the seal of the door 58 around the power source compartment 50 by the magnetic force, which acts to tighten engagement with the elastic sealing material 64.

With reference to FIG. 11, the door 58 also includes a display portion 68. The display portion 68 may have any desired shape. In the illustrated implementation, the display portion 68 is generally elongated and extends laterally across the door 58. The lawn mower 12 also includes a first light 72 and a second light 76, each of which is disposed adjacent the display portion 68, e.g., laterally adjacent as illustrated or adjacent in any other direction. However, one light, three lights, or more lights may be employed in other implementations, and one, some or all of the light or lights may abut the display portion 68. The first and second lights 72, 76 each include one or more light emitting diodes (LEDs), but may each include any type of illuminant in other implementations. The display portion 68 may be at least partially formed from a light conductive material such that the display portion 68 appears illuminated when one or both of the first or second lights 72, 76 is illuminated. In other words, light from one or both of the first or second lights 72, 76 is conducted within the display portion 68 and emitted from the display portion 68 to give the appearance of illumination. Thus, the display portion 68 is disposed in light communication with one or both of the first or second lights 72, 76. The display portion 68 may include indicia 80, such as a logo or logos, an image or images, a letter or letters, a word or words, a character or characters, or any combination thereof. The indicia 80 may be formed in the light conductive material such that the indicia 80 appears to be illuminated when one or both of the first or second lights 72, 76 is illuminated. In some implementations, the indicia 80 may be formed from non-light conductive material such the illumination appears around the indicia 80.

As illustrated in FIGS. 12-14 and described below, the power source compartment 50 is selectively drainable. More specifically, the power source compartment 50 is selectively drainable other than through the door 58, e.g., the drain functionality is not provided by the door 58. The housing 40 defining the power source compartment 50 may include a drain aperture 42 (best illustrated in FIG. 14) configured to allow fluid to drain from the power source compartment 50, e.g., under the effect of gravity. The drain aperture 42 may be disposed in a lower portion of the housing 40, e.g., lower relative to the door 58, and/or in a lower half of the power source compartment 50, and/or in a lower third of the power source compartment 50, and/or in a lower quarter of the power source compartment 50, and/or in a lower 10% of the height of the power source compartment 50, and/or at or near a bottom of the power source compartment 50. The drain aperture 42 provides fluid communication between the power source compartment 50 and an external environment 100 other than through the door 58, either directly or indirectly. For example, the drain aperture 42 may provide direct fluid communication from the power source compartment 50 to the external environment 100 in some implementations, or may provide indirect fluid communication from the power source compartment 50 to the external environment 100 in other implementations. Indirect fluid communication may be provided in any suitable manner, such as by way of another opening (not shown) on the deck 14, or by way of any other suitable structure. Thus, the door 58 selectively opens and closes a door aperture 84 to open and close the power source compartment 50, and the drain aperture 42 is independent of the door aperture 84.

The housing 40 also defines a power source receptacle 88 for receiving the power source 24. An electrical terminal 92 is disposed in the power source compartment 50, specifically in the power source receptacle 88, for electrically coupling the power source 24 to the prime mover 16.

As illustrated in FIGS. 13-14, a stopper 94 (which may also be referred to herein as a drain stopper 94) selectively opens and closes the drain aperture 42. The stopper 94 is movable between a draining position in which the drain aperture 42 is in fluid communication with the external environment 100 for draining fluid and a stopped position (FIG. 14) in which the second aperture is closed. In some implementations, the stopper 94 is manually moved by an operator (e.g., by sliding the stopper 94 manually); in other implementations, the stopper 94 is moved in response to movement of another part of the lawn mower 12, such as the power source 24 and/or the door 58, or any other part; in yet other implementations, the stopper 94 seals the drain aperture 42 under the effect of gravity when the lawn mower 12 is flipped over. In the flipped over orientation, the lawn mower 12 is upside-down relative to the normal orientation of the lawn mower 12 during a lawn cutting operation, and a user may wash the bottom of the deck 14, e.g., with pressurized water, in the flipped over orientation. The stopper 94 may be movable between the draining position and the stopped position in any suitable fashion, such as slidable, as illustrated herein, which is not to be regarded as limiting, or rotatable, pivotable, insertable, rockable, expandable, retractable, movable by a movable valve member, etc.

In yet other implementations, the stopper 94 is electronically moved. For example, the stopper 94 may be movable by programming movement of a linkage 96, 96' to move the stopper 94. Such programming may be programmed into the controller 200. The controller 200 may be configured to move the stopper 94 automatically or in response to a user input such as through the human-machine interface 216. Automatic control may include programming the controller 200 to move the stopper 94 in response to input from the sensor 214, which may send a signal corresponding to a position of the power source 24 and/or a position of the door 58, or the like. Thus, the controller 200 may be programmed to move the stopper 94 in response to movement of any part of the lawn mower 12, such as the power source 24 and/or the door 58, or any other part, or in response to a user input.

The stopper 94 may be a valve member (e.g., a ball, a butterfly, a pin, a disk, a needle, a plug, a plunger, a piston, etc.) movable between the stopped position in which the valve member is seated in a valve seat to effectively close the second aperture and the draining position in which the valve member is not seated in the valve seat to allow fluid communication between the power source compartment 50 and the external environment 100 for draining. Other types of valve members are also possible. The stopper 94 (e.g., valve member) may be controlled electronically, e.g., by a solenoid or any other electronic means and may be controlled by the controller 200 as described above. The stopper 94 may be a check valve member, and a check valve including the stopper 94 may allow draining out of the power source compartment 50 while inhibiting entrance of external fluid into the power source compartment 50 through the drain aperture 42. Other types of one-way valves are also possible. A pump may be employed in other implementations, the pump being configured to remove fluid from the power source compartment 50.

The stopper 94 may include an elastic material such as rubber, elastomer, silicone, etc., or may include a rigid material such as metal, plastic, etc.

In the illustrated implementation of FIG. 13, which is not to be regarded as limiting, the linkage 96 is operatively coupled between the power source 24 and the stopper 94 to mechanically move the stopper 94 in response to movement of the power source 24. The stopper 94 is configured to move to the stopped position when the power source 24 is inserted into the power source compartment 50 and to move to the draining position when the power source 24 is removed from the power source compartment 50. More specifically, the power source 24 is inserted into the power source receptacle 88 to move the stopper 94 to the draining position. Movement of the stopper 94 to the draining position may occur in response to the power source 24 being electrically coupled with the electrical terminal 92.

The linkage 96 may have any suitable configuration to operatively couple insertion/removal of the power source 24 with movement of the stopper 94. However, in the illustrated implementation, which is not to be regarded as limiting, the linkage 96 includes a drain actuator 97 configured to move between a resting position towards which the drain actuator 97 is biased towards the power source compartment 50 and an engaged position in which the drain actuator 97 is moved by engagement of the power source 24 therewith. In the resting position, the drain actuator 97 is at least partially disposed in the power source compartment 50 and the stopper 94 is in the draining position. One or more links 98 are operably coupled between the drain actuator 97 and the stopper 94 to impart movement to the stopper 94 in response to movement of the drain actuator 97. The one or more links 98 may include any combination of pivotable, slidable, rocking, and/or rotatable member(s), springs, and/or any other suitable motion transfer means such as one or more gears. A substantial portion of the linkage 96 is provided external to the power source compartment 50, e.g., in an interior space between the deck 14 and the power source compartment 50. The substantial portion may include the one or more links 98 and/or a portion of the drain actuator 97. This lessens interference with placement of the power source 24. Thus, with no power source 24 inserted into the power source compartment 50, the power source compartment 50 is drainable. When the power source 24 is inserted into the compartment 50, the power source compartment 50 is substantially sealed such that fluid is inhibited from entering the power source compartment 50 through the drain aperture 42. As a result, the operator may clean the lawn mower 12 without cleaning fluid entering the power source compartment 50 and wetting the power source 24. Furthermore, when the power source 24 is removed, any fluid entering the power source compartment 50 is able to drain through the drain aperture 42.

The linkage 96 (e.g., the drain actuator 97) may be embodied as a sensor (e.g., see sensor 214 in FIG. 3) configured to send a signal to the controller 200 corresponding to the presence or absence of the power source 24 in the power source compartment 50. For example, but not to be regarded as limiting, the sensor 214 may include a button, a switch, a lever, an optical sensor, a proximity sensor, a Hall effect sensor, a motion sensor, any type of actuator moved by engagement with the power source 24 or sensing a position of the power source 24, etc. With an electronic linkage 96, there may be no need for the one or more links 98 mechanically coupling the drain actuator 97 to the stopper 94. In other implementations, the drain actuator 97 may be configured to be actuated by the door 58, or by any other part of the lawn mower 12, or manually by an operator.

An alternative implementation of the linkage 96 is illustrated in FIG. 14. In the illustrated implementation of FIG. 14, a linkage 96' is operatively coupled between the door 58 and the stopper 94 to mechanically move the stopper 94 in response to movement of the door 58. The stopper 94 is configured to move to the stopped position when the door 58 is closed (as illustrated) and to move to the draining position when the door 58 is open. The stopper 94 may be configured to move to the draining position or an intermediate position allowing draining when the door 58 is in the intermediate position (FIG. 9), or simply when the door 58 is not closed. Alternatively, the stopper 94 may be configured to move to the stopped position when the door 58 is moved from the open position to the intermediate position (FIG. 9). Other signaling positions are possible. Thus, the position of the stopper 94 depends on the position of the door 58.

The linkage 96' may have any suitable configuration to operatively couple movement of the door 58 with movement of the stopper 94. However, in the illustrated implementation, which is not to be regarded as limiting, the linkage 96' includes one or more links 98' configured to convert movement of the door 58 into movement of the stopper 94. The one or more links 98' may include any combination of pivotable, slidable, rocking, and/or rotatable members, springs, and/or any other suitable motion transfer means such as one or more gears. Thus, with the door 58 open, the power source compartment 50 is drainable. A substantial portion of the linkage 96' is provided external to the power source compartment 50, e.g., in an interior space between the deck 14 and the power source compartment 50. The substantial portion may include the one or more links 98' and/or a portion of the drain actuator 97'. This lessens interference with placement of the power source 24. When the door 58 is closed, the power source compartment 50 is substantially sealed such that fluid is inhibited from entering the power source compartment 50 through the drain aperture 42. As a result, the operator may clean the lawn mower 12 without cleaning fluid entering the power source compartment 50 and wetting the power source 24. Furthermore, when the power source 24 is removed, any fluid entering the power source compartment 50 is able to drain through the drain aperture 42.

The linkage 96' may be embodied as a sensor (e.g., see the sensor 214 in FIG. 3) configured to send a signal to the controller 200 corresponding to the position of the door 58. For example, but not to be regarded as limiting, the sensor 214 may include a button, a switch, a lever, an optical sensor, a proximity sensor, a Hall effect sensor, a motion sensor, any type of actuator moved by engagement with the door 58 or sensing a position of the door 58, etc. With an electronic linkage 96', there may be no need for the one or more links 98' mechanically coupling the drain actuator 97 to the stopper 94.

In operation, with respect to door movement, each support 86 is coupled to the door 58 such that when the hinge mechanism 62 is in the closed position, the door 58 is closed over the power source compartment 50 and the compartment 50 is sealed. To open the compartment 50, the door 58 is first moved slidingly without rotation away from the stop button (e.g., rearwards, in the direction S) to break the seal. The door 58 thus slidingly moves to an intermediate position (FIG. 9) in which the hinge seat 70 does not interfere with the hinge body 82. The door 58 is then rotated (e.g., upwards, in the direction R), about the pivot shaft 78, and the compartment 50 is opened. To close and seal the power source compartment 50, the door 58 is first rotated (e.g., downwards) then translated (e.g., forwards). Thus the door 58 slides back into sealing engagement with the housing surface structure 54.

In operation, with respect to fluid drainage, water or moisture (or any other fluid, such as cleaning solution) may enter the power source compartment 50, particularly when the door 58 is open. In order to reduce fluid that may interfere with the electrical components (e.g., the power source 24 and/or the electrical terminal 92, etc.), the power source compartment 50 is drainable, e.g., through the drain aperture 42. The fluid may pass through the drain aperture 42 under the effect of gravity, or may be pumped through the drain aperture 42. The power source compartment 50 may drainable when the door 58 is open and stopped when the door 58 is closed. Stopping the drain aperture 42 when the door 58 is closed allows the operator to clean the lawn mower 12 and inhibits cleaning fluid (such as water, pressurized water, cleaning solution, etc.) from entering the power source compartment 50 through the drain aperture 42. Additionally or alternatively, the power source compartment 50 may be drainable when the power source 24 is removed and stopped when the power source 24 is disposed in the power source compartment 50. Stopping the drain aperture 42 when the power source 24 is in the power source compartment 50 protects the power source 24 (e.g., from cleaning fluid if the operator cleans the lawn mower 12 with the power source 24 inserted).

The magnetic closure 60 holds the door 58 in the closed position, e.g., when the lawn mower 12 is transported, carried, flipped over for cleaning/maintenance, etc.

In some implementations, the power source 24 may include a power cord or other power-supplying contact (not shown) configured to charge an on-board battery pack on board the lawn mower 12, the power cord/contact (not shown) being selectively receivable in the power source compartment 50 and configured to mate with the electrical terminal 92 embodied as a charging terminal (such as the battery charging contact 26) in the power source compartment 50. Thus, the selectively drainable power source compartment 50 disclosed herein may also be useful when the power source compartment 50 is embodied as a charging compartment.

While the disclosure has focused on a power source compartment 50 and hinge 66 for a robotic mower, and on a drainage arrangement for the power source compartment 50, it is equally applicable to other types of battery powered garden tools such as a vacuum cleaner, a trimmer, a string trimmer, a brush cutter, a hedge trimmer, a sweeper, a cutter, a plow, a debris blower, a snow blower, etc.

Although the disclosure has been described in detail with reference to preferred implementations, variations and modifications exist within the scope and spirit of one or more independent aspects of the disclosure as described.

Thus, the disclosure provides, among other things, a garden tool 12 having a power source compartment 50 with drainage, and also provides a garden tool 12 having a hinge mechanism 62 that allows a battery compartment door 58 to open and close directly adjacent a stop button and seal the battery compartment 50 against water intrusion.

The invention claimed is:

1. A garden tool comprising:
a prime mover;
a housing defining a power source compartment, the housing defining a first aperture and a second aperture each in communication with the power source compartment;

a power source configured to provide power to the prime mover, the power source removably receivable in the power source compartment; and a door configured to move between a closed position in which the first aperture is closed and an open position in which the first aperture is open; and a stopper configured to selectively close the second aperture, the stopper being movable between a draining position in which the second aperture is in fluid communication with the external environment for draining fluid and a stopped position in which the second aperture is closed;

wherein the second aperture is configured to provide fluid communication between the power source compartment and an external environment for draining fluid from the power source compartment; and wherein the stopper is configured to move to the stopped position in response to the power source being inserted into the power source compartment and to move to the draining position in response to the power source being removed from the power source compartment.

2. The garden tool of claim 1, further comprising a linkage operably coupled to the stopper and engageable by the power source in the power source compartment.

3. The garden tool of claim 2, wherein the linkage is disposed at least partly outside the power source compartment.

4. The garden tool of claim 1, further comprising an electrical terminal disposed in the power source compartment, the electrical terminal configured to electrically couple the power source to the prime mover.

5. The garden tool of claim 1, wherein the garden tool is a robotic lawn mower comprising:

a plurality of wheels operatively coupled to the prime mover and configured to convert tractive effort into motion of the robotic lawn mower on a support surface; and a blade configured to cut vegetation.

6. A garden tool comprising:

a housing defining a power source compartment;

a power source configured to provide power to a prime mover, the power source receivable in the power source compartment;

a door configured to selectively close the power source compartment;

an aperture defined in the housing and configured to provide fluid drainage from the power source compartment independent of the door; and a stopper configured to selectively close the aperture, wherein the stopper is movable between a draining position in which the aperture is in fluid communication with an external environment for draining fluid and a stopped position in which the aperture is closed;

wherein the stopper is configured to move to the stopped position in response to the power source being inserted into the power source compartment and to move to the draining position in response to the power source being removed from the power source compartment.

7. The garden tool of claim 6, further comprising a linkage operably coupled to the stopper and engageable by the power source in the power source compartment.

8. The garden tool of claim 6, further comprising an electrical terminal disposed in the power source compartment, the electrical terminal configured to electrically couple the power source to the prime mover.

9. An electric lawn mower comprising:

a housing defining a power source compartment with an aperture;

a prime mover;

a power source configured to provide power to the prime mover, the power source removably receivable in the power source compartment;

a plurality of wheels operatively coupled to the prime mover and configured to convert tractive effort into motion of the electric lawn mower on a support surface;

a blade configured to cut vegetation;

a door configured to selectively open and close the power source compartment; and a stopper configured to selectively close the aperture, the stopper being movable between a draining position in which the aperture is in fluid communication with the external environment for draining fluid and a stopped position in which the aperture is closed; and wherein the stopper is configured to move to the stopped position in response to the power source being inserted into the power source compartment and to move to the draining position in response to the power source being removed from the power source compartment.

10. The electric lawn mower of claim 9, further comprising a linkage operably coupled to the stopper and engageable by the power source in the power source compartment.

11. The electric lawn mower of claim 9, further comprising an electrical terminal disposed in the power source compartment, the electrical terminal configured to electrically couple the power source to the prime mover.

12. The electric lawn mower of claim 9, wherein the housing defines a top and a bottom generally opposite the top, wherein the blade is disposed closer to the bottom than the top, wherein the door is at least partially disposed on the top, and wherein the power source compartment is selectively drainable through the bottom.

* * * * *